(12) United States Patent
Yost

(10) Patent No.: US 11,383,982 B2
(45) Date of Patent: Jul. 12, 2022

(54) REAGENT SYSTEM FOR REMEDIATING MINE WASTE AND OTHER SOLID WASTE CONTAMINATED WITH HEAVY METALS

(71) Applicant: HMR Solutions, Inc., Brooklyn, NY (US)

(72) Inventor: Karl William Yost, Anacortes, WA (US)

(73) Assignee: HMR Solutions, Inc., Brooklyn, NY (US)

( * ) Notice: Subject to any disclaimer, the term of this patent is extended or adjusted under 35 U.S.C. 154(b) by 198 days.

(21) Appl. No.: 16/167,450

(22) Filed: Oct. 22, 2018

(65) Prior Publication Data

US 2020/0282251 A1    Sep. 10, 2020

Related U.S. Application Data

(60) Provisional application No. 62/575,290, filed on Oct. 20, 2017.

(51) Int. Cl.
| | |
|---|---|
| *A62D 3/33* | (2007.01) |
| *C01B 25/00* | (2006.01) |
| *A62D 3/36* | (2007.01) |
| *A62D 3/38* | (2007.01) |
| *B09C 1/08* | (2006.01) |
| *A62D 101/43* | (2007.01) |

(52) U.S. Cl.
CPC ............... *C01B 25/00* (2013.01); *A62D 3/33* (2013.01); *A62D 3/36* (2013.01); *A62D 3/38* (2013.01); *B09C 1/08* (2013.01); *A62D 2101/43* (2013.01); *A62D 2203/02* (2013.01)

(58) Field of Classification Search
CPC ... A62D 3/33; A62D 3/36; A62D 3/38; A62D 2101/43; A62D 2203/02; B09C 1/08
USPC ....................................................... 423/299
See application file for complete search history.

(56) References Cited

U.S. PATENT DOCUMENTS

| | | | |
|---|---|---|---|
| 4,671,882 A | 6/1987 | Douglas et al. | |
| 5,193,936 A | 3/1993 | Pal et al. | |
| 5,250,276 A | 10/1993 | Knuuttila et al. | |
| 6,027,543 A | 2/2000 | Yoshizaki et al. | |
| 6,204,430 B1 | 3/2001 | Baldwin et al. | |
| 6,258,018 B1 * | 7/2001 | Pal | C04B 28/04 |
| | | | 588/256 |
| 2010/0150657 A1 | 6/2010 | Ball | |
| 2016/0222291 A1 * | 8/2016 | Sugano | B09C 1/08 |
| 2016/0229721 A1 * | 8/2016 | Rissanen | C04B 28/18 |
| 2018/0236435 A1 * | 8/2018 | Jung | B01J 20/048 |

OTHER PUBLICATIONS

PCT/US2018/056945—International Search Report and Written Opinion, dated Mar. 11, 2019 (from Applicant's counterpart PCT application).
PCT/US2018/056945—International Preliminary Report on Patentability, Feb. 24, 2020 (from Applicant's counterpart PCT application).
"Sodium Hexametaphosphate," Wikipedia, Feb. 20, 2017, pp. 1-3, https://en.wikipedia.org/indix.php?title=Sodium_hexametaphosphate &oldid=766424229, retrieved Jan. 2019.

* cited by examiner

*Primary Examiner* — Edward M Johnson
(74) *Attorney, Agent, or Firm* — John D. Carpenter

(57) ABSTRACT

A reagent system for treating heavy metal-contaminated materials is provided and includes an oxidizer, a soluble phosphate, and an alkaline hydroxide source, such as a caustic soda or lime. A method of treating mine waste bearing one or more heavy metals is also provided and includes the step of admixing a reagent system with heavy metal-containing material to preferentially reduce the leachability of heavy metals and form precipitates and complexes of low metal solubility that remain stable within the host solid matrix for long durations in acidic and abrasive conditions.

5 Claims, 14 Drawing Sheets

REAGENT SYSTEM FOR REMEDIATING MINE WASTE AND OTHER SOLID WASTE CONTAMINATED WITH HEAVY METALS

CROSS-REFERENCE TO RELATED APPLICATION

This application claims the benefit of U.S. provisional patent application No. 62/575,290, filed Oct. 20, 2017, the entire contents of which are incorporated herein by this reference.

FIELD OF THE INVENTION

The invention relates to methods and reagents for remediating heavy metal-contaminated solid waste, soil, sediments, and related material at mines and othering sites.

BACKGROUND OF THE INVENTION

Environmental pollution due to heavy metals in soil, mining residues, and other solid wastes is a serious problem. Groundwater contamination resulting from the leaching out, mobilization and entry of heavy metal species into the water table is of particular concern. The Resource Conservation and Recovery Act (RCRA; 42 U.S.C. § 6901 et seq.) directs the United States Environmental Protection Agency (EPA) to establish controls on the management of hazardous wastes, from the point of generation, through transport, storage, and disposal. Title 40 of the Code of Federal Regulations provides the regulatory framework for complying with RCRA.

RCRA identifies eight heavy metals that warrant particular concern—whether in elemental, ionic, or covalent species form—because of their toxicity to human and other life: arsenic, barium, cadmium, chromium, lead, mercury, selenium, and silver. Although selenium and trace amounts of chromium are needed for human health, all eight metals are toxic at some level. The EPA regulates the allowable limits for these metals in the parts-per-million range: 1-5 ppm, depending on the metal; 0.2 ppm for mercury.

Other heavy metals, not governed by RCRA, can also pose a threat to the environment and human health. The Clean Water Act, the Safe Drinking Water Act, the Superfund Amendments, the Emergency Planning and Community Right-to-Know Act of 1986 ("EPCRA"), and other federal laws govern the release and risks posed by numerous hazardous substances, including metals outside the RCRA 8, such as aluminum, copper, iron, manganese, nickel, vanadium, and zinc.

Numerous methodologies exist for addressing solid wastes contaminated with heavy metals. They vary widely in their effectiveness, suitability for a given site, breadth of metal-specific efficacy, and cost. Converting characteristically hazardous RCRA waste into non-hazardous waste is a goal often aimed for, yet seldom achieved. Key questions include: Where should the solid waste be treated, on-site or off-site? Should the waste be removed for treatment, or treated in situ? How close is the waste to an aquifer or other environmentally sensitive area? What is the pH of the waste? What is the propensity for the waste to be impacted by ambient conditions—water runoff, rainfall, snowfall, snow melt, flood waters, etc.—which may lower the pH of the waste? Most proven technologies are effective on only a few of the RCRA 8 metals, due to the problematic chemistry of specific metals. Historic research and technology developments are also limited, often restricted to the RCRA 8 metals (and the RCRA solid waste evaluation test methods), and inadequate for large contaminated sites. Preferred treatment remedies typically revert to cement and/or other pozzolanic agents, which are not only costly but also contribute significantly to waste volume and mass expansion, and create an end-product prone to long-term deleterious effects from prolonged exposure to acidic and other conditions typically found in a landfill, conditions that neutralize the alkaline metallic-hydroxide species and degrade the physical immobilization properties of the treated material.

Engineered repositories using on-site and other aggregate materials for their construction have typically been designed and constructed in efforts to provide long-term management of these materials. Unfortunately, this remedy does not address the issues of acid-generating properties of the materials being interned, leaving long-term risk of metal release stemming from contact with impacted site groundwater, acid rain, other mine-related waters that can intrude into or percolate down through the repository structure. When materials have been treated before onsite management, suitable treatment technology selection options have been limited to cement or other pozzolanic additives. These rely on the formation of hydroxides and the physical immobilization of the metal contaminants of concern. Without addressing the acid generation properties of the materials, these physical immobilization strategies are subject to degradation over time, and will allow the release of metals when exposed to acidic fluids. These immobilized materials can also degrade as a result of sulfide species present in the material, which can continue to generate acid.

Other technologies that are selected to treat heavy metals are typically based on performance for RCRA metals in general, and are often limited in their ability to reduce long-term leachability of all metals, and especially those hazardous metal substances that are not subject to RCRA regulation under the toxicity rule for hazardous waste. Examples, such as manganese, copper, zinc, and others are either non-reactive to these technologies, or as stated above, subject to mobilization with contact or exposure to acidic conditions.

Prior remediation methods that provide sulfide, phosphate, hydroxide, pozzolans, sulfate, carbonates and/or mixtures and variations of these do not address metals with multivalent states such as arsenic, chromium, manganese, iron, and others in conjunction with those metals that are most often present in divalent form regardless of pH or oxidizing or reducing conditions. The same prior art does not disclose the importance of oxidizing conditions to treat metals such as manganese, ferrous iron, arsenic, and others, thus limiting the breath of the technology with respect to these metals, as they affect chemical conditions associated with long-term and repeated exposure to acidic conditions from various site fluids, the generation of "new acid" in the treated material body mass. Furthermore, non-RCRA 8 metals have not been adequately researched or actually addressed as part of the broad-spectrum of metals found in materials at mine sites or other types of sites and wastes where such metals may be present, despite the fact that non-RCRA metals also contribute to the suite of hazardous substances that can cause risk or actual harm to human health or the environment with their migration.

For a given mining, industrial, or other site contaminated with heavy metals, a threshold question is whether the concentration of heavy metals is low enough that the waste can be treated and then disposed of in a non-hazardous waste landfill (relatively inexpensive), or higher, requiring the waste to be treated and then disposed of in a RCRA Subtitle C hazardous waste landfill (potentially extremely expensive). For large sites contaminated with heavy metals, there may also be a need to stabilize the site in situ to prevent or minimize further leaching of heavy metals into the immediate vicinity of the site, and to protect the water table against heavy metal intrusion. To determine the concentration of leachable heavy metals, one measures heavy metal concentration using a leachability test. The EPA publication "Test Methods for Evaluating Solid Waste: Physical Chemical Methods," referred to as "EPA Publication SW-846," the "SW-846 Compendium," or simply "SW-846," describes analytical methods for sampling and analyzing waste and other materials. The 1000 Series is directed to waste characteristics and leaching/extraction methods.

Although most of the methods described in SW-846 are intended as guidance, the method defined parameters (MDPs) are mandated by the RCRA regulations in Title 40 of the Code of Federal Regulations (CFR). MDPs are physical or chemical properties of materials determined with specific methods used to evaluate whether the materials comply with certain RCRA Subtitle C regulations. MDPs can only be determined by the methods prescribed in RCRA regulations because the methods are set by the federal regulations. The "toxicity characteristic" of solid waste is a mandatory defined parameter. See 40 CFR § 261.24. As provided in SW-846a, Test Method 1311 (Toxicity Characteristic Leaching Procedure ("TCLP"); Revision 0, 1992) is an analytical method used to distinguish between hazardous and non-hazardous waste, and a MDP test method under the framework mandated by RCRA and SW-846. The procedure described in Test Method 1311 is used to prepare a sample of waste for analysis, and the concentration of RCRA heavy metals is then quantified in the resultant sample extract. If any metal concentration in the TCLP extract equals or exceeds the toxicity characteristic limit for that specific metal, the waste must be classified as hazardous. See 40 CFR § 261.24. The TCLP test (Test Method 1311) was devised by the EPA and promulgated to evaluate how waste material and heavy metals in that waste would interact with acidic landfill leachate and the physical conditions found in non-hazardous landfills. For solid waste, heavy metals that leach in excess of the RCRA limit will cause the waste to be considered hazardous, because the heavy metals could leach into the landfill leachate and, if the landfill is of poor integrity, into groundwater underlying the landfill.

The TCLP test utilizes one of two extraction fluids. Extraction Fluid #1 is made by adding glacial acetic acid to reagent-grade water, adding sodium hydroxide, and diluting with additional water. The final solution has a pH of 4.93+/−0.05 standard units (S.U.). Extraction Fluid #2 is made by diluting glacial acetic acid with water. The final solution has a pH of 2.88+/−0.05 S.U. TCLP Test Method 1311 calls for the extraction of a representative sample of the solid waste using one of the two fluids based on the buffering capacity of the waste being tested. Importantly, the method looks at the response of a solid waste sample (and the RCRA metals it hosts) to a synthetic landfill leachate fluid that contains acetate, in acidic conditions generated from the typical anaerobic biological processes that occur in sanitary landfills characterized by high levels of organic materials, water, and a lack of oxygen. While appropriate for evaluating heavy metal leachability and solubility in municipal solid waste landfills, TCLP Test Method 1311 is not readily applicable to heavy metal-bearing solid waste that is not intended for disposal in a sanitary/municipal waste landfill and/or will not be exposed to acetate, but that still needs to be safely managed for long-term duration.

Acid Mine Drainage (AMD) is a fluid generated at locations where sulfide and metals have been removed historically from geologic formations in the exploitation and recovery of valuable metals such as gold, silver, copper, lead, zinc, and others. Acidic drainage is a naturally occurring process that propagates when metallic sulfides, often iron pyrite, are exposed to water and oxygen. In the presence of acidophilic bacteria that exist in acidic conditions where oxygen, sulfide, and/or ferric ion are available, the reaction accelerates to increase the yield of sulfuric acid (acidity and sulfate). Acidity causes metals in solids to further dissolve, and converts sulfide to sulfate if oxygen is available.

AMD is the fluid that drains from such mines, but also from undeveloped natural formations containing sulfide or iron minerals where conditions exist to initiate the acid formation and dissolution of hosted metals. At mine sites, whether abandoned, legacy, inactive, or active, the formation of acidic and other mine drainages that contain soluble metals continues to be a significant source of hazardous metal substance loading to down-gradient water and the environment. While many mine sites were initially explored and subsequently exploited in order to recover a specific metal or mineral, most resource deposits contain a broad-spectrum of metals that can become mobile when exposed to acid mine drainage.

In addition, and as allowed under the Bevill Amendment to RCRA, mine materials and residuals that leach hazardous metal substances are all too often exempt from solid waste management RCRA regulation, and contribute contaminant loading to the surrounding environment. As such, Test Method 1311 is not a technically appropriate test method for evaluating the leachability and solubility of hazardous metal substances at mine locations or sites impacted with mining activities where acidic conditions exist or could be generated due to pyritic conditions. At such sites, of course, heavy metals can be leached from their host materials when exposed to groundwater, surface water run-off, percolation, snow melt, creek or river water, flood water, seeps, or other such fluids. Regardless of the legal regulations, leachable metal substances will always respond to chemical, geochemical, engineering, and other forces, including gravity and migration principles of a fluid, creating risk and potential harm to human health and the environment.

Alternative leaching tests are available for evaluating heavy metal-bearing solid materials in accordance with EPA SW-846. Two methods that are suitable for evaluating the leachability of heavy metals from materials containing hazardous substances that may be managed on a site include SW-846 Test Method 1312 (Synthetic Precipitation Leaching Procedure—SPLP), Test Method 1320 (Multiple Extraction Procedure—MEP), and modified versions of each. With these methods, as published in EPA SW-846, the extract fluids are prepared from solutions of sulfuric and nitric acids. While these acids are constituents of acid rain, sulfuric acid is very common to acid mine and acid rock drainage. SPLP-approved fluids are chosen from one of two fluids that attempt to replicate the ratio of sulfuric and nitric acids in acid rain common to the eastern and western United States. Test Method 1320 provides for ten (10) sequential extractions of the same sample aliquot using fresh SPLP fluid appropriate for the region of the country where a particular site and waste material is located.

Another series of EPA testing procedures includes SW-846 Test Methods 1313 through 1316, developed and evaluated by the EPA's National Risk Management Research Laboratory (NRMRL). These methods, referred to as the Leaching Environmental Assessment Framework (LEAF), include integrated test procedures, data analysis and evaluation considerations, and an array of support utilities for making environmental management decisions under a comprehensive framework.

As described in the EPA publication EPA-600/R-10/170, November 2010, "Background Information for the Leaching Environmental Assessment Framework (LEAF) Test Methods", Test Method 1313 evaluates "Liquid-Solid Partitioning as a Function of Extract pH for Constituents in Solid Materials using a Parallel Batch Extraction Procedure." Test Method 1314 evaluates "Liquid-Solid Partitioning as a Function of Liquid-Solid Ratio for Constituents in Solid Materials using an Up-flow Percolation Column Procedure." Test Method 1315 applies to "Mass Transfer Rates of Constituents in Monolithic or Compacted Granular Materials using a Semi-dynamic Tank Leaching Procedure," and Test Method 1316 applies to "Liquid-Solid Partitioning as a Function of Liquid-Solid Ratio for Constituents in Solid Materials using a Parallel Batch Extraction Procedure".

While each of these LEAF methods has the potential to apply to the technology of the present invention and the subsequent management of treated materials, the extract fluids used in the LEAF test methods do not incorporate critical components of acidic fluids or contain heavy metals found at mining and other sites. They utilize reagent-grade nitric acid, potassium hydroxide, reagent-grade high-purity water, and/or calcium chloride as specified for each specific test method and relative to the nature of the matrix being tested to evaluate the leachability of metals. These reagents, their high grade of purity, and the various compositions of the eluents used for the LEAF methods are not common to site conditions where material treated by the invention would be managed. Indeed, although sulfuric acid is quite often encountered in acid rain and/or acids generated at mine sites, it is not provided as a reagent in the LEAF testing methodology, nor are other minerals that are typically found in the environment. Consequently, the LEAF methods cannot adequately address actual chemical conditions found at project sites, or the potential interrelationship and contact between site fluids and their chemical properties and those of the material treated by the invention.

Although the LEAF program methods are comprehensive, integrated, and will provide significant information related to how heavy metals leach out of various materials under different test conditions, they will not accommodate actual conditions or the specific chemistry of fluids that may continually inundate mining and other waste (and the heavy metals contained therein) at a site where invention-treated material may be managed for the long term or the chemical exposures such solid material would or could encounter. Regardless of argued applicability to invention-treated material for its on-site post-treatment management, and based on the chemistry of the invention reagents that include an oxidizer, and other mineral-precipitating enhancements, treated metals hosted within treated material will retain their stability with exposure to LEAF test procedures and protocols.

Germane to the current invention and the site conditions where invention-treated material would be managed and subjected are the more rigorous Test Methods 1312 and 1320 when they are properly modified and applied. Both methods allow for modified versions of extraction fluids where eluents can be obtained from a similar or actual site where material will be treated. Examples include groundwater, storm water run-off, snow melt, acid creek or river water, or acid mine/rock drainage from the site where the solid material may be located. While Test Method 1312 is a "one" extraction sample preparation step, Test Method 1320 is intended to evaluate a material's hosted constituents' response to repeated and robust exposure to the conditions imparted by the eluent fluid and the abrasion derived from sample tumbling by particle-to-particle contact. If test results from a modified Test Method 1320 (using site fluids as eluent) show that the heavy metals remain stably retained in the test sample even after ten (10) serial, sequentially modified Test Method 1312 extractions (modeling 1000-year exposure to the fluid), site managers and professionals that design remedies for mining and other sites where heavy metals exist will have the ability and favorable professional comfort levels to design long-term material management into the remedial program for the given site, knowing that materials treated by the invention will remain stable to site conditions they may repeatedly encounter over a prolonged duration.

The preferred extraction fluid to be used in the modified methods is actual fluid from the site where the invention is to be applied, and may include acidic creek water or acid mine drainage. Using this in the modified Test Method 1320, the previous fluid of a completed extraction is separated from the solid sample after tumbling, analyzed for target metals, and a new aliquot of the site fluid is applied to the extracted solid for the next serial extraction. In this repeated manner, the invention-treated material is subjected to fresh site fluid and its constituents (i.e. acidity, heavy metals, others) as it would likely encounter in actual site conditions. This is unlike the LEAF program where lab-purity reagent is added to the fluid to maintain proper test method conditions in parallel extractions of differentiated test fluids.

Furthermore, the presence and behavior of heavy metals within the actual site fluid can be evaluated as a result of contact with the treated material, a benefit being that the treated material of the invention removes metals from the fluid thus enhancing the quality of site waters.

Despite years of effort, and a vast body of prior art intended to address RCRA and hazardous metal substances contamination in industry and the environment, there remains a need for safe and effective methods for treating historic mining related materials that are impacted with a broad-spectrum of leachable heavy metals, acidity from site materials and other materials that may also contain heavy metals, precipitation sourced fluids, and/or other factors that lead to heavy metal leaching.

SUMMARY OF THE INVENTION

The present invention provides a treatment technology for stabilizing solid materials containing heavy metals that can leach as a result of long-term exposure and contact with acidic fluids common to mining sites and other sites that contain leachable heavy metals, but also to landfill leachate as defined under RCRA. The chemistry of landfill leachate containing acetic acid is much different than that of acid rain or mine drainages that contain sulfuric acid, particularly as those fluids affect the solubility and leachability of heavy metals. The technology includes a method and reagent system for treating leachable metal species in solids, soils, and other wastes using an oxidizer, phosphate, and hydroxide in order to convert a broad-spectrum of metals to more reactive forms, convert these and others in the material to less leachable forms, bring the contaminated material into compliance with various statutes and regulations (including RCRA, the federal regulations related to RCRA, and related EPA directives and guidelines relating to land disposal and waste management), and minimize the release of leachable heavy metals to the environment when exposed to acidic and other fluids common to mine sites, whether active, inactive, legacy, abandoned or otherwise for long-term duration.

In a first aspect of the invention, a reagent system is provided and includes an oxidizer, a soluble phosphate ($PO_4^{3-}$), and an alkali hydroxide or hydroxide source such as a caustic soda (NaOH), potash (KOH) or lime (CaO). When admixed with heavy metal-containing material (and water, as needed), the reagent system will preferentially reduce the leachability of heavy metals and form an end product—precipitates and complexes of low metal solubility—that remain stable within the host solid matrix for long durations in acidic and abrasive conditions. The end product will not only retain the metals it contains within the solid mass, but also remove heavy metals that may be carried by the leaching fluid that may come in contact with the processed material. Residual solid materials common to historic mining operations and exploitation of mineral reserves that host leachable heavy metals, such as aluminum, arsenic, cadmium, chromium, copper, iron, lead, manganese, nickel, selenium, silver, zinc, and others are sources of hazardous substances that migrate from abandoned, legacy, and active mine sites. These heavy metals in particular, and especially metals with multiple ionic valence states such as arsenic, chromium, iron, manganese and selenium, cause unique management difficulties. The present invention reduces the solubility of these and other metals and their leachability from solid mine residuals such as tailings, overburden, waste rock and ore, ore residuals, beneficiated solids from ore processing, sediments, water treatment residual solids, other solid waste, and similar impacted materials when exposed to acid rain, acid mine drainage, mine water seepage, precipitation run-off, snow melt, creek flood water, landfill leachate, and the like, and when such fluids are acidic and/or also contain hazardous heavy metal substances as defined by 15 USCS § 1261 (f), [Title 15. Commerce and Trade; Chapter 30; CERCLA Section 101(14); Sections 311 and 307(a) of the Clean Water Act; Section 101(14) of 40 CFR 261.20 under RCRA; and other environmental laws.

In a second aspect of the invention, a method for reducing the solubility and leachability of heavy metals—in elemental, ionic, or covalent species form—found in mining waste and similar solid materials is provided. In one embodiment, the method includes the step of admixing a reagent system as described herein with heavy metal-contaminated waste (and water, as needed). The result is an end product having reduced leachability heavy metals, even when exposed to mine influenced waters, acidic fluids, or acid-generating properties of solids material, such as pyritic bearing residuals, common to materials found at mining sites. The method can be used to lower the leachability of RCRA 8 metals as well as other heavy metals.

The method and reagent system for treating leachable metal species in solids, soils, and other wastes uses the combination of an oxidizer, phosphate, and alkali hydroxide or hydroxide source in order to convert a broad-spectrum of metals to more reactive forms; convert these and others in the waste material to less leachable forms; bring the contaminated material into compliance with various statutes and regulations, not only including The Resource Conservation Recovery Act (42 U.S.C. § 6901 et seq.), Title 42 of the Code of Federal Regulations, and related United States Environmental Protection Agency (U.S. EPA) directives and guidelines relating to land disposal and waste management; and minimize the release of leachable heavy metals to the environment when exposed to acidic and other fluids common to mine sites, whether active, inactive, legacy, abandoned or otherwise for long-term duration.

While the invention was devised to reduce the leachability of the wide range of heavy metals found at mine sites, it is also similarly suited and applicable to a wide range of other materials and metal-bearing wastes. Examples include those sites or materials that contain or host heavy metals that will leach from the source matter when exposed to acidic or other wet conditions, including landfill leachate, acid rain, groundwater, percolation, and/or tide water intrusion. The invention is particularly well suited for remediating metals such as iron and manganese and others that have multiple valence states based on oxidation/reduction characteristics of the materials and their source.

BRIEF DESCRIPTION OF THE DRAWINGS

Various features and benefits of the invention will become better understood when considered in light of the following figures, which are graphs depicting leachability data compiled for various embodiments of the invention.

FIG. 1A provides data for aluminum, FIG. 1 B for cadmium, FIG. 1C for copper, FIG. 1D for iron, FIG. 1E for manganese, and FIG. 1F for zinc.

FIG. 2A provides data for aluminum, FIG. 2B for cadmium, FIG. 2C for cobalt, FIG. 2D for copper, FIG. 2E for iron, FIG. 2F for manganese, FIG. 2G for nickel, and FIG. 2H for zinc.

DETAILED DESCRIPTION

Figure 1A:
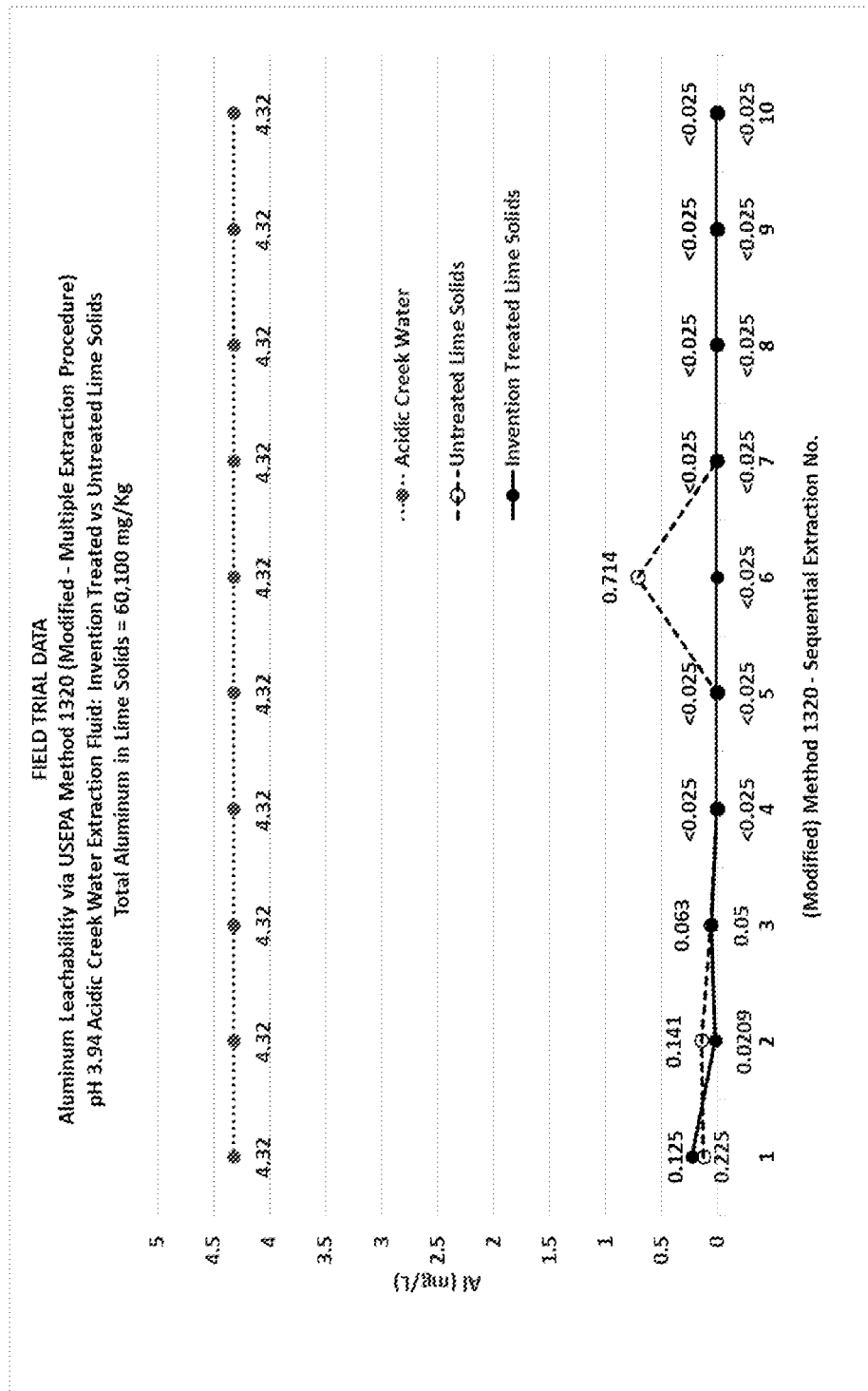
FIGS. 1A-1F compare metal leachability data using acidic creek water as the extraction fluid in a modified Method 1320 MEP leachability test comparing leachable metals in invention-treated lime solids against metals as totals in the acidic creek water and those in extracts of untreated lime solids.

In a first aspect of the invention, a reagent system for treating mining waste and other material or solid waste contaminated with one or more heavy metals is provided. The reagent system includes an oxidizer, soluble phosphate, and alkali hydroxide or hydroxide source. The reagent system can also include water. When applied to a heavy metal-contaminated solid waste, the reagent system will preferentially cause metals to form non-leachable insoluble precipitates and complexes within the host solid matrix. Each reagent is equally important to the reaction.

Nonlimiting examples of suitable oxidizers include hydrogen peroxide, hypochlorous acid (at acidic or neutral pH), hypohalites, persulfate, percarbonates, perborate, ozone in aqueous solution, other mixed oxidants, and other compounds and reagents having the ability to generate hydroxyl radicals or facilitate heavy metal species electron loss, and/or that accepts electrons from the problematic species in the host matrix being treated with enhanced presence of hydroxyl radicals being preferred. Some oxidizers will be provided as aqueous solutions (e.g., hydrogen peroxide), while other oxidizers are provided as dry reagents, and/or as aqueous solutions. Mixtures of oxidizers also can be used.

Nonlimiting examples of soluble phosphates suitable for inclusion in the reagent system include phosphoric acid, trisodium phosphate ($Na_3(PO_4)$), referred to as "TNaP"

herein), and phosphate salts containing calcium, for example, calcium phosphate ($Ca_3(PO_4)_2$). Combinations of soluble phosphates can be used. The phosphate(s) may be provided as dry reagents and/or as aqueous solutions. An acidic, soluble phosphate such as phosphoric acid provides free phosphate ion to react with heavy metal cations that have been converted to reactive states, as well as others within the host matrix, including metals such as calcium and other species not targeted for treatment, but which are present and compete for reagents nonetheless.

Nonlimiting examples of suitable alkali hydroxides and hydroxide sources include caustic soda (NaOH), potash (KOH), lime (CaO), slaked lime (CaOH), and mixtures thereof. Lime is a hydroxide source because it reacts with water to form slaked lime, some of which dissolves to produce an alkaline solution known as limewater ($Ca(OH)_2$ $_{(aq)}$). The alkali hydroxide or hydroxide source(s) can be provided as dry reagents and/or as aqueous solutions. In addition, and as described below in greater detail, trisodium phosphate (TNaP) can serve as both the soluble phosphate and the alkaline hydroxide source.

The three reagents of the reagent system can be added to a material being treated in amounts ranging from 0.25-10% oxidizer, 0.5-8% phosphate, 0.5-10% hydroxide; more preferably, 0.25-5% oxidizer; 0.25-6% phosphate; 0.5-8% hydroxide, by weight of the mass of material being treated, on a dry weight basis (for solid reagents). The reagents can be provided as a dry mixture of oxidizer, phosphate, and hydroxide (if all reagents are dry solids), as a solution, as a slurry, or in some other form suitable for application to a waste or other material contaminated with heavy metals.

The oxidizer converts multivalent metals to ionic states where they will more readily complex with and/or adsorb to other metals in the host matrix and react with other components of the reagent system. Importantly, the oxidizer will convert acid-generating species such as residual metallic sulfides in mine-related materials to oxidized species such as sulfate. Thus, the oxidizer ensures that metals in the material being treated are more available for reaction with the phosphate and/or hydroxide components of the reagent system. Destruction of sulfide residuals by oxidation in solid material during treatment also minimizes the acid-generating properties of the material over future prolonged periods of time. Ferrous iron (Fe+2) will also be oxidized to more reactive ferric iron (Fe+3) by the oxidizer. Without the oxidizer, ferrous iron will not be converted to a more insoluble form, and it has the potential to react with any sulfides that are present, in the presence of various microbes, to generate more acid from the acid-generating constituents of the solid material after treatment.

To a lesser degree, but important with some materials at certain waste sites, the oxidizer will facilitate the degradation of organic matter such as fulvic and humic acids, tannins, other organic compounds, and organo-metallic compounds. Such organic matter may lower metal leachability and solubility via ion-exchange, absorption, chelation, and other mechanisms in the short-term, but over time, as microbial and other biological processes metabolize or otherwise decay the organic matter, the metals can become less stable and prone to leaching. Oxidizer degradation of organic matter with the accompanying release of metals that were partially or temporarily immobilized are then made available for reaction with the other reagents of the reagent system.

The oxidizer can be provided from an off-site source as an import reagent, or manufactured on site, particularly if treatment will be performed at an operating or legacy mine with an adequate supply of acid mine drainage (AMD), thus sulfate, and/or carbonate if water is excessively "hard" due to the presence carbonates, where persulfates or percarbonates may be intentionally generated by electrochemical oxidation technologies or other such processes.

Manganese, common to mining active and legacy mine sites, is typically present in its reduced and non-reactive soluble state. Further and typically present in well studied and researched ratios with iron in its ferrous ($Fe^{+2}$) and ferric ($Fe^{+3}$) states, manganese in its reduced state is a result of anaerobic conditions and the lack of an oxidizing agent (such as oxygen or other dominant electron attracting species).

Ferrous iron has the ability to sorb or chelate with other metals present, thus keeping them soluble when exposed to acidic fluids and extract fluids. Arsenic, an RCRA 8 metal, is another example of a multivalent metal which, when reduced, is highly soluble and susceptible to sorption by iron when iron is in its soluble state, typically as $Fe^{+2}$.

An oxidizer is also essential for effective treatment of some metals. The overall oxidation-reduction potential (ORP) of the waste is an indicator of oxidizer demand. Excess or insufficient oxidant provided in the technology requires application optimization by one skilled in the art to prevent conditions that inadequately alter target multivalent metals' oxidation states, but also to prevent over dosage that would compromise the technology reagents. To optimize the choice of oxidizer, and its dosing rate, one should consider other materials within the host matrix that might compete for oxidant and other reagent components. Such materials can include, for example, humic and fulvic acids, hydrocarbons, and other constituents or byproducts derived from the anaerobic biological degradation of organic matter.

The predominant metal species formed with free phosphates are typically apatite minerals by nature, and they precipitate as complexed, mixed mineral forms within the host matrix. The oxidizer will full oxidize iron species often found in soils and other target materials, converting them from ferrous ($Fe^{+2}$) to ferric ($Fe^{+3}$) form. In addition the iron species can react with phosphate ion ($PO_4^{3-}$) to form insoluble phosphate minerals, and such minerals will also complex with other metals hosted in the target material by sorption and other geochemical means and mechanisms in an ordered manner predicted by solubility products (Ksp).

If phosphoric acid is selected as the soluble phosphate component of the reagent system, its acidity will help disassociate metals such as lead within the host matrix so that they are in ionic forms readily available for reaction with the oxidizer and the phosphate ions. This is important, as some metals, when exposed to acidic extraction fluid, may disassociate, causing elevated results in leachate above desired limits.

Solutions of sodium hydroxide, potassium hydroxide, and/or lime can elevate pH in solid materials. The caustic solutions can be diluted readily on site and provide the alkalinity that can be needed to facilitate remediation reactions of many metals, while also limiting the need to add supplemental water for mixing and reagent dispersion. The caustic solutions also will not provide calcium, which could compete with other technology reactants, and the hydroxide ions in such caustic solutions will help neutralize acidity contributed by an acidic phosphate, or sulfuric acid often found within solid mine-related residuals. However, without the oxidizer, long-term generation of acid from sulfide residuals in solid materials may eventually overcome the neutralization capacity provided by the hydroxide reagent.

When sulfide residuals are present in mine-related materials and other wastes, the exposure of such materials to acidic conditions can generate hydrogen sulfide, a toxic and hazardous gas that is heavier than air. Hydrogen sulfide can also contribute to the acid-generating properties of the material. With the present invention, sulfide is converted to sulfate, and associated metals are released for reaction with remaining invention reagents. Consequently, the risk of generating hydrogen sulfide is greatly diminished.

In one embodiment of the invention, trisodium phosphate (TNaP) is selected as both a source of soluble phosphate and hydroxide. TNaP dissolves readily in water, forming an alkaline solution containing both phosphate ions and hydroxide ions necessary for the heavy metal remediation reactions. The choice of whether to use TNaP with the oxidizer vs. using the oxidizer with a separate soluble phosphate and hydroxide reagent can be made by considering the properties of the solid material to be treated and the metals being targeted. Where the acidity of a separately supplied phosphate component is not beneficial to degrading partially stable metal species, the oxidizer/TSP reagent system may be preferable, particularly when adequate or excessive moisture is present in the untreated material.

Calcium has an affinity for phosphate when calcium is present in host matrix, or when added as a component of a reactant. The solubility product (Ksp) for the dissolution of calcium phosphate in water at 25° C. is $2.07 \times 10^{-33}$, which indicates that calcium phosphate is highly insoluble, and it further suggests that a priority ordering of calcium precipitate formation with phosphate will create competitive conditions for the free phosphate with the metals targeted for treatment. As such, reagents that contain calcium are less preferable, or must be carefully dosed and/or sequenced in the treatment processing to assure that calcium does not interfere with the desired reactions or otherwise necessitate higher reagent dose rates, thus elevating overall process cost. Nevertheless, quicklime (CaO) and hydrated lime (calcium hydroxide) are examples of suitable alkalinity-producing reagents (alkaline hydroxide sources) that will increase the overall pH of the host matrix to facilitate heavy metal insolubilization through the formation of metallic hydroxides, particularly with metals that require oxidation to form species that are more reactive with phosphate and hydroxide forms of various metals are not conducive to the formation of apatite minerals of reduced solubility, as predicted by common solubility tables for Ksp.

In one embodiment of the invention, an oxidizer coupled with two reagents such as phosphoric acid and an alkaline hydroxide source such as caustic soda may either or both be substituted for the single reagent, trisodium phosphate. In this scenario, free phosphate and alkalinity are provided with one reagent when water is provided to enhance reagent dispersion within the matrix or used for mixing, or present in excessively wet host target material. TNaP, not to be confused with triple-super phosphate, is highly soluble in water, and when dissolved, raises the pH as part of the hydration dissolution process mechanism. The high pH will contribute the necessary hydroxide ions to the host matrix and other metals that are present in the host matrix that is in an oxidative condition. An additional benefit of using TNaP as a phosphate/hydroxide reagent is that it does not provide calcium.

TNaP readily forms a solution with water with an alkaline pH. This feature enhances metallic-hydroxide formation, and prevents the formation and release of hydrogen sulfide gas should sulfide per present. The highly soluble TNaP releases phosphate ions when in solution where these ions will react with other metals, but in particular, calcium. If the phosphate were provided in the form of ortho-phosphate (phosphoric acid) or tricalcium phosphate or triple super phosphate, or phosphate rock, the calcium from the phosphate would not readily allow phosphate release to react with target metals.

Heavy metal residuals common to historic mining operations and exploitation of mineral reserves can include aluminum, arsenic, cadmium, chromium, copper, iron, lead, manganese, nickel, zinc, and other metals, which can leach from solid material found at abandoned, legacy, and active mine sites, and especially heavy metals with multiple ionic valence states such as arsenic, chromium, iron, and manganese. The invention reduces the solubility of these metals and their leachability from solid mine residuals such as tailings, overburden, waste rock and ore, extracted ore residuals (which have mineral value in their own right); beneficiated solids from ore processing, sediments, water treatment residual solids, solid waste, and similar impacted materials when exposed to acid rain, acid mine drainage, mine water seepage, precipitation run-off, snow melt, creek flood water, landfill leachate, and the like, and especially when such fluids are acidic and/or also contain hazardous heavy metal substances.

The reagent system can be used to render heavy metals in host material non-leachable, as evaluated by SW-846 Test Method 1320 (Modified Multiple Extraction Procedure). The reagent system can be used to treat heavy metals to comply with the EPA's Land Disposal Restrictions for RCRA hazardous waste defined by the RCRA characteristic rule for toxicity. The reagent system will treat leachable metals common to legacy mining sites that are not on the RCRA toxicity characteristics list, but also leachable metals considered to be hazardous substances under CERCLA and EPCRA regulation, and which, if in a dissolved or leachable state, would be regulated by various federal and state water quality regulations should they migrate into local waters such as those on the US EPA Priority Pollutant list regulated under at 40 CFR Part 423.

It is well known that the lower the solubility product constant (Ksp) value of a compound, the lower the solubility of that compound in water at the reported temperature. Of course, published Ksp values are based on the use of high-purity compounds, with measurements obtained using highly controlled methodologies. In the real world of hazardous material sites, Ksp constants can only be used as a reference when inferring leachability of these compounds from soil, solid materials, waste, and other media. Nevertheless, they do allow for some prediction as to the stability of reagents and end-products with respect to various conditions, characteristic, treatment, and extraction fluid-based test methods, particularly when various adsorption and bi-metal complexes can form. The following table presents some Ksp values for various end-products formed by the present invention, noting that these are generally accepted in the literature for specific species in determined using laboratory grade water and high purity laboratory conditions.

TABLE 1

Solubility Product Constants for Invention Reagent System End-Products
Ksp Values of Some Invention Metallic End-products

| Metal | Ksp | Comment |
|---|---|---|
| Aluminum | $3 \times 10^{-34}$ | amphoteric |
| Arsenic | $2.53 \times 10^{-33}$ | oxidation state |

TABLE 1-continued

Solubility Product Constants for Invention Reagent System End-Products
Ksp Values of Some Invention Metallic End-products

| Metal | Ksp | Comment |
|---|---|---|
| Cadmium | $2.2 \times 10^{-33}$ | |
| Chromium | $1 \times 10^{-30}$ | amphoteric |
| Cobalt | $2.05 \times 10^{-35}$ | |
| Copper | $8 \times 10^{-37}$ | amphoteric |
| Iron (II) | $3.6 \times 10^{-41}$ | oxidation state |
| Iron (III) | $1 \times 10^{-88}$ | |
| Lead | $7.9 \times 10^{-43}$ | amphoteric |
| Manganese | $1 \times 10^{-22}$ | oxidation state |
| Mercury | $3.1 \times 10^{-26}$ | oxidation state |
| Nickel | $4.74 \times 10^{-32}$ | |
| Zinc | $1.0 \times 10^{-32}$ | amphoteric |

NOTES:
1) Amphoteric properties and valence state of metals are critical to solubi
2) Ksp values are nominal, but typically accepted in the literature
3) Based on metallic phosphate, hydroxide, and complexes thereof From the published Ksp values, it is evident that the intended end-products, namely metallic phosphates, hydroxides, and other bimetallic complexes (e.g. metallic-arsenates) of the described invention have extremely low solubility in water. It is also evident that the reagents of the reagent system provided in this invention (i.e., containing an oxidizer, phosphate, and alkaline hydroxide source) are very soluble relative to other prior art reagents and end-products, thus allowing for the invention reagents to react efficiently with problematic constituents as discussed herein. In mining situations where all or most of the metals listed in Table 1 are present in a given material, treatment methodologies that do not include an oxidizer—such as the methodologies taught by the prior art—will not yield a desirable end-product in which the metals are all converted to species of reduced leachability. Prior art systems that include a phosphate, sulfide, sulfate, and/or hydroxide, but no oxidizer, will not achieve the desired objective of reducing heavy metal leachability in contaminated mining waste and similar materials containing a broad range of metals.

For example, when in an oxidized state, manganese and iron (III) will form phosphate mineral species as well as hydroxide species, whereas other metals such as copper, nickel, and zinc will form substances of low solubility without the oxidizer, and both the iron and manganese will remain in a soluble state. Manganese, chromium, arsenic, and selenium are examples where, without proper control of oxidation conditions, they may remain leachable in water, and likely more so in acidic fluids. With the present invention's inclusion of the oxidizer, the reagent system will reduce the leachability of all such metals, whether the metals are present singularly or with other metals.

Iron is an example of a metal having multiple ionic states driven by oxidation/reduction potential. The ability of ferrous iron to cause acidic pH in the presence of sulfide and/or anaerobic conditions, coupled with the tendency of other metals (e.g., arsenic) to sorb to it in this state, will create leaching conditions for not only the iron, but those sorbed metals as well.

In another aspect of the invention, a method of treating heavy metal-contaminated material to obtain an end-product having reduced heavy metal leachability includes the step of admixing the heavy metal-contaminated material with a reagent system comprising an oxidizer, a water soluble phosphate, and an alkali hydroxide or hydroxide source as described herein. The relative amounts of the reagents typically range from 0.25-10% oxidizer, 0.5-8% phosphate, 0.5-10% hydroxide; more preferably, 0.25-5% oxidizer; 0.25-6% phosphate; 0.5-8% hydroxide, based on the total weight of reagents, on a dry weight basis (for solid reagents). In one embodiment, the method includes the additional step(s) of adding and/or removing water from the material being treated to achieve a target moisture content of from 5-60% by weight.

Water can be added to the material being treated in order to enhance contact of the invention reagents with heavy metals, facilitate mixing, lubricate waste particles to improve reagent dispersion throughout the target matrix, increase the mobility of leachable forms to better react, control dust, and/or to activate trisodium phosphate (TNaP) to its soluble alkaline condition. Water addition requirements are primarily a function of the characteristics of the material to be treated. Extremely dry material will require more water, and fully saturated sediments or slurries, for example, may not require any water to be added.

For typical soils contaminated with one or more heavy metals, a moisture range of 5-12% is ideal, and water should be added to the soil, if needed, to achieve this minimal range. For excessively wet and saturated materials such as sludges, slurries, and sediments, facilities should be designed to stage treated material for containment purposes and to allow it to drain and dry if required for the final management of the treated material. In a severe case, the waste material can be dewatered prior to, or after, treatment using gravity or mechanical dewatering means. In such a case, treatability studies performed by a person skilled in the art will help to optimize reagent dosing and assess process cost with respect to where and how operational dewatering would be most economically and productively performed.

In all processing cases, excess water beyond what is needed for reactions to proceed can unnecessarily dilute the reactants relative to the density of the waste material (and thus the metal concentrations), and could potentially compromise the leachability of heavy metals from the end product. Excess water will also increase the mass of the treated end-product, increase the cost of handling the end product, and create free liquids that are regulated with respect to material disposal at licensed landfill facilities, making management and handling of the treated material difficult and problematic. Conversely, providing too little water will prevent the reagents from adequately reacting to form metal species of reduced leachability; reagents may not be adequately dissolved and alkaline conditions not properly adjusted; and the desired reaction between phosphate, hydroxide, and metal species may be thwarted.

The oxidizer, phosphate, and alkali hydroxide or hydroxide source reagents can be added to the contaminated material in combination, or individually, with oxidizer added separately from the phosphate and/or alkali hydroxide or hydroxide source. The reagents can be provided in dry form or, alternatively, some or all of the components of the reagents can be provided as an aqueous slurry. If the reagents are added as a slurry (or as individual slurries), the water contained therein can be sufficient to raise the moisture content of the contaminated material to the desired minimum of at least 5% water by weight.

One benefit of the present invention is that water is not incorporated into the waste material mass via cementitious or pozzolanic reactions. As such, excess water is free to leave the treated mass by gravity drainage, mechanical agitation, centrifugation, evaporation, capillary drying, or other physical means. This is of great importance to large-scale environmental cleanup and remediation projects where the treated end-product must be transported offsite and disposed of on a unit cost per disposed ton basis, or when material is managed on-site where acidic conditions, erosion, weathering, and other site-specific forces can affect the material.

When a liquid solution of slurried reagent is desired for the treatment process application, calculated masses of each component can be added to a mixing container or tank, and makeup water added to prepare the desired reagent solution concentration. Heterogeneous mixing and suspension of the reagents with the water can be achieved by spindle, paddle, or other suitable mixers in the tank, or by pump recirculation. The pump can also be used to deliver the reagent fluid to the waste in a waste-reagent mixer based on predetermined dose requirements for batch mixing, or flow rates based on continuous mixer waste feed rates.

In another highly effective reagent delivery method, dry reagent component—if used—can be added at the proper ratio with liquid reagents to the mixer via gravity feed from silos or elevated super sacks. Reagent addition rates can be controlled via weigh cells integrated with off-loading silo augers or conveyor belts. Super sacks can be held with a front-end loader or excavator equipped with a suspended scale system, load-cell, or integrated with the equipment bucket hydraulics. In a very simplistic delivery method, prepackaged bags of reagents of known mass can be added to the mixer manually. With these types of reagent deliveries to the waste and mixer, water is added, preferably in the form of mutually beneficial misting sprays that also mitigate dust from the contaminated material and reagent during treatment blending and mixing operations.

In a preferred embodiment, each reagent can be added directly to the target waste individually, or as a combined blend. Each reagent or a combined blend of the liquids and solids may be put into a slurry or solution mixture form with water for that slurry or solution mixture to be added to the waste material. Water may be added to facilitate dissolution of the reactants in the reagent blend as a slurry, but at a dose that also meets the minimal need for the blending and reaction of the reagent blend's reactants with the heavy metal in the contaminated material. Ideally, water for reagent makeup, if needed, and/or for mixing with the material to be treated, is used from the site even if it is acidic and/or contains elevated levels of heavy metals.

With respect to the dose rate or amount of each reagent, in a preferred embodiment the oxidizer is added at a dose of 0.25 to 2% by weight, phosphoric acid is supplied at a dose of 0.25% to 6% by weight, and pH is adjusted to a basic pH of at least 8.5 S.U. with 10-50% caustic soda such that the total addition of reagent to the targeted treatment mass is in the range of 1-10% by weight and excluding any water that might be needed. The end pH and the amounts of oxidizer and phosphate to be added will depend on the various target metals present in the host matrix being treated, taking into account whether any of the metal species are amphoteric and/or in a reduced, oxidized, non-reactive state, or partially leachable state, and also taking into account the concentration of the oxidizer. For example, in one embodiment containing hydrogen peroxide as the oxidizer, a preferred dose rate is 30-50% hydrogen peroxide. In another embodiment, where a blended solid/liquid oxidizer is employed, the dose rate may be as low as 3-5%.

Oxidizer dosing rates are also a function of the stability and amount of oxidizable constituents in the material being treated, coupled with the combination of the oxidation potential of the oxidant with the mass of the material being treated and the concentration of oxidants (e.g. hydroxyl radicals, and others) provided by the reagent. While the preferred dose of an oxidizer is up to 2%, the actual dose required will be driven by the characteristics of the untreated material, its constituents, and those of the selected oxidizer. One should evaluate untreated materials that contain constituents that might also compete for invention reagents, or alternatively, substances that will facilitate invention reactions without the need to provide the spectrum of reagents of the invention. As an example of the later, the presence of oxygen, phosphate or lime in untreated materials can greatly influence a desirable reduction in the amount of or the ratios of reagent required to achieve the desired invention reaction end-products.

When the reagent system comprises a liquid solution of oxidant and TNaP for the treatment process application, measured masses of each can be added to a mixing container or tank, and makeup water added to prepare the desired reagent solution concentration. Heterogeneous mixing and suspension of the reagents with water can be achieved by spindle mixers in the tank, or by pump recirculation. The pump may also be used to deliver the reagent fluid to the waste in a mixer based on predetermined dose requirements for batch mixing, or flow rates based on continuous mixer waste feed rates.

In another embodiment, the oxidizer is prepared or manufactured on site using electrolytic/electrochemical means. When sulfate is available at an elevated concentration in acid mine drainage, that fluid (AMD) taken alone, or enhanced with additional sulfate and/or carbonate, and/or ionic halides such as chloride or bromide, can be converted to a suitable oxidizer containing mixed oxidants. These can include: hydroxyl radicals, hydrogen peroxide, ozone, persulfates, percarbonates, hypohalites, "hypochlorous/hypobromous" acids at neutral to acidic pH, or blends of the same as mixed oxidants. At mining sites or other sites with materials that contain manganese at elevated levels in the site water, permanganate formation is also viable with appropriate electrochemical production equipment.

The technology is best performed in a process where a mixing shaft, paddles and blades are controllable with respect to the rate and direction of rotation, and overall retention within the mixing chamber to achieve thorough mixing and the desired reaction end-points. Reversal of the mixing shaft assembly will allow for prolonged mixing. However, a more economical method that can also be as effective is by direct in situ application of reagents to targeted material surfaces and their subsequent blending to predetermined depths and volumes using agricultural or heavy earthwork equipment such as plows, discs, tillers, scarifiers, ripping implements, rubblizers, excavator or loader buckets, trenchers, and the like.

Other continuous feed-discharge type mixers such as pugmills or brick mixers may also be adequate to achieve desired mixing requirements; however such equipment tends to offer process operators less flexibility to accommodate waste material properties and process reactions variables. Batch mixers are also more capable of handling high water content in the material being treated. As water content increases, the reactants are more likely to permeate various particles of waste and debris carrying with it the reactants to contact with mercury. Batch mixers are designed to handle higher water/fluid content materials than pugmills or continuous flow-through mixing units. Crushed concrete and bricks are prime examples of target material that may contain mercury within its interstitial spaces, where higher water content and increased mixing time will improve the treatment of mercury within. When such debris types or particle sizes are encountered, the applicator of the technology may choose to pre-screen the material to remove larger objects that might damage the mixing equipment, as well as any oversized materials not conducive to reagent penetration.

In another delivery and mixing method, rotating augers and cutter heads may be used to vertically mix technology reagents in vertical soil columns from the ground surface down to the bottom elevation of the contaminated soil vertical limits. Overlapping columns (secant) will produce the most uniformly mixed material horizontally across a project site, with reagents delivered down the drill or Kelly shaft and outward to the mixing blades from the vertical shaft center line to the extent of their outer diameter cutting and mixing path. Such in situ mixing equipment is designed to deliver reagents and mix them with materials to be processed. The disclosed technology reagents and reaction chemistry are well suited for in situ application to mercury contaminated material using this common type of construction equipment, provided however, that subsurface obstructions and anomalies are identified and managed prior to the start of treatment or when encountered.

EXAMPLES AND COMPARATIVE STUDIES

The charts presented as Figure-series 1 and 2 provide results from a field trial conducted in October 2017 at an EPA NPL Superfund Site that is a historic mining district with abandoned mines and legacy impacts to the environment related to past and current acidity and migratory heavy metals. In 2016, the EPA installed and has since operated a lime-based (calcium hydroxide) treatment system to address the ongoing acid mine drainage (AMD) that also carries heavy metal hazardous substances from one of the legacy mines within the NPL site. A by-product of that treatment system is lime solids that contains heavy metals, many of which are leachable.

The pilot study and the preceding laboratory bench-scale treatability performed in advance of the on-site pilot were performed to further evaluate and refine the present invention's ability to reduce the leachability of all heavy metals and hazardous substances of concern contained by the lime-treatment system of the mine-influenced AMD. An additional objective of the study was to determine whether the invention could reduce the level of leachable metals in the lime solids to meet various water quality objectives established by the EPA under the Clean Water Act, as well as water quality applicable to the watershed of the NPL site location as established by the Colorado Department of Public Health and the Environment (CDPHE) in their Table Value Standards of the regulations, and specifically those relative to aquatic life. While treatment performed during the field trial did not attempt to optimize the invention to meet all water quality objectives, the study did allow for the testing and gathering of pre- and post-treatment data to allow for disclosure of this invention. Further, the data also demonstrated the ability of invention-treated material to remove heavy metals contained in mining-influenced waters sourced from the site that were characterized as acidic and containing elevated levels of heavy metals.

The pilot study conducted on site consisted of applying invention reagents to EPA's filter-bag dewatered lime solids as well as other reagents. Approximately 1.5 tons of lime solids were processed in total using a grout mixer, site water (AMD from the AMD being treated by the lime-based water treatment system), and the various treatment reagents. A scale was used to measure the mass of lime solids, reagents and additives, including water, added to the mixer on a weight percent basis to the lime-solids as provided by the EPA in each of the various treatment regimens.

Other than on-site pH and other field measurements, all analytical laboratory testing was performed by third-party commercial laboratories. All testing was performed in accordance with EPA SW-846 methods, procedures, and Quality Assurance/Quality Control protocols with modified versions of Method 1312 and 1320 conducted as discussed later in this disclosure.

In summary of the modified test methods, two (2) separate site fluids were used in Method 1312 and Method 1320 as the eluents. Method 1312—Synthetic Precipitation Procedure Leaching (SPLP), is a single extraction sample preparation step that uses a fluid that replicates acid rain for either eastern or western US. Method 1320—Multiple Extraction Procedure (MEP) consists of a series of ten (10) sequential Method 1312 extractions where the post extraction fluid is removed from the solid material. The extracted solid is then extracted again with new SPLP fluid and extracted again. This process is repeated ten (10) sequential times in a serial manner. In both methods, the fluid separated from the extracted solid is analyzed for heavy metals as totals in the resultant fluid, and that fluid is then discarded.

For the modified testing in one series, the SPLP extraction fluid was substituted for actual water obtained from a creek impacted with historic mining influences. This water was acidic, and contained some heavy metals found in the lime solids and others that were not. In the second series of tests, SPLP extraction fluid was actual acid mine drainage from another mine located near the mine where the AMD was sourced, which was being treated by EPA. As with the acid creek water, metals within the AMD used for the extraction fluid contained some of the same metals in the lime solids, as well as others that were not. Both extraction fluids were acidic with a pH of less than 4.0 S.U.

Table 2 presents the analytical data for both of the fluids used as extraction fluids in the modified methods as well as the metals as totals in Untreated Lime Solids as provided by the USEPA for use in the pilot study.

TABLE 2

Pilot Study Characterization Data

| Acid Fluid Source for Modified Extractions | pH (S.U.) | Metals as Totals (mg/L) | | | | | | | | |
|---|---|---|---|---|---|---|---|---|---|---|
| | | Al | Fe | Cd | Co | Cu | Pb | Mn | Ni | Zn |
| Acidic Creek Water | 3.94 | 4.32 | 29.10 | 0.0122 | NT | 0.0840 | 0.0233 | 20.9 | NT | 6.30 |
| Acid Mine Drainage | 3.02 | 4.61 | 101 | <0.0050 | 0.148 | 0.0201 | 0.0196 | 44.9 | 0.0862 | 18.5 |
| Solid Matrix Treated | | Metals as Totals (mg/Kg) | | | | | | | | |
| AMD Lime-based Water Treatment System Solids | 8.29 | 60,100 | 246,000 | 175 | 146 | 13,100 | 64.1 | 22,600 | 103 | 39,200 |

With respect to differences between the acidic creek water and the AMD, AMD contained higher levels of each respective metal for aluminum, iron, copper, manganese, and zinc. A primary reason for this was due to the mineral residuals within the mine sourcing the AMD. Creek water was obtained from a flowing stream that drains multiple high elevation mountain basins where numerous abandoned legacy mines are located, and where many are actively releasing AMD. Over the course and alignment of the creek, flowing water encounters significant elevation changes with turbulent waterfalls and major cascades, but also zones of quiescent laminar flow. These variations in water flow significantly alter the chemistry of AMD released from the various mines with oxygenation, creek bed mineral dissolution from erosion/corrosion, solids settling via sedimentation, scouring and solids transport, dilution from surface water run-off and its metal and sulfide constituents, and contributions of organic biological matter. AMD on the other hand, was sourced directly from the mine where steady laminar flow was not exposed to water channel or other significant impacts from prevailing weather, scouring and settling or contributions associated with similar biological organic matter. AMD was more concentrated with heavy metals and contained higher acidity as evident with differences in pH.

Table 3 presents the treatment regimens by reagent and dose to the lime solids that were provided by EPA for the pilot study. This data is presented in connection with additional data provided in the Figure charts. The data in Tables 3, 4, and 5 includes total and leachable metals in untreated samples of the study, as well as leachable metals in treated material Method 1311 (TCLP) and Method 1312 (SPLP) extracts performed according to respective method procedures. The data in the Figures was generated from testing of untreated lime solids and lime solids processed in Treatment 07 using the modified extraction methods described elsewhere.

TABLE 3

Comparison of Various Treatment Regimens and the Invention Reagent System as Measured by Metals in TCLP and SPLP Extracts

| Reagent | Treatment Regimen | | | | | | |
|---|---|---|---|---|---|---|---|
| | 01 | 02 | 03 | 04 | 05 | 06 | 07 |
| Hydrogen Peroxide | | | 0.50% | 0.50% | | 0.50% | 1.0% |
| CaS | | 2.00% | | | 5.00% | 7.50% | |
| H3PO4 | 3.00% | | | 3.00% | | 0.75% | 3.0% |
| TriNaPhos | | 2.00% | 2.00% | | | | |
| TripSupPhos | | | | | 7.00% | | |
| Ca hydroxide | | | | | 2.00% | 2.00% | 4.0% |
| CaPolyS | | | 4.00% | | | | |
| Reagent Mass (% of soil mass) | 3.0% | 4.0% | 2.5% | 3.5% | 14.0% | 10.8% | 8.0% |

| | Untreated | | Treatment Regimen | | | | | | |
|---|---|---|---|---|---|---|---|---|---|
| Parameters | Total (mg/Kg) | TCLP (mg/L) | 01 | 02 | 03 | 04 | 05 | 06 | 07 |
| | | | Total Metals in Method 1311 (TCLP) Extract (mg/L) | | | | | | |
| Aluminum | 60,100 | 9.11 | 0.080 | 0.211 | 1.67 | 1.35 | <0.046 | <0.046 | <0.046 |
| Arsenic | 70.5 | <0.103 | <0.103 | <0.103 | <0.103 | <0.103 | <0.103 | <0.103 | <0.500 |
| Cadmium | 175 | 0.579 | <0.052 | <0.052 | 0.294 | 0.264 | <0.052 | <0.052 | <0.250 |
| Cobalt | 146 | 0.622 | 0.434 | 0.415 | 0.407 | 0.431 | 0.023 | 0.061 | <0.250 |
| Copper | 13,100 | 21.3 | <0.113 | <0.113 | <0.113 | 0.393 | <0.113 | <0.113 | <0.113 |
| Iron | 246,000 | <0.102 | <0.102 | <0.102 | 13.5 | 6.22 | 0.530 | 90.8 | <0.102 |
| Lead | 64.1 | 0.022 | <0.018 | <0.018 | 0.025 | 0.027 | <0.018 | <0.018 | <0.018 |
| Manganese | 22,600 | 107 | 129.0 | 116 | 102 | 108 | 16.0 | 35.1 | 0.356 |
| Nickel | 103 | 0.291 | 0.212 | 0.216 | 0.231 | 0.270 | 0.046 | 0.131 | <0.250 |
| Zinc | 39,200 | 152 | 34.8 | 33.7 | 77.1 | 62.5 | 0.037 | 0.033 | 0.027 |
| | Total (mg/Kg) | SPLP (mg/L) | Total Metals in Method 1312 (SPLP) Extract (mg/L) | | | | | | |
| Aluminum | 60,100 | 0.336 | 21.3 | 17.6 | 9.81 | 1.07 | 0.91 | 0.40 | 0.22 |
| Arsenic | 70.5 | <0.001 | <0.001 | <0.001 | 0.001 | 0.001 | <0.001 | 0.008 | <0.001 |
| Cadmium | 175 | 0.0009 | <0.0005 | <0.0005 | <0.0005 | 0.024 | 0.0005 | 0.001 | <0.0005 |
| Cobalt | 146 | <0.050 | 0.0006 | 0.0001 | 0.0006 | 0.0594 | 0.0007 | 0.006 | 0.0005 |
| Copper | 13,100 | 0.0442 | 0.0399 | 0.0112 | 0.0561 | 0.650 | 0.0340 | 0.0492 | 0.0162 |
| Iron | 246,000 | 0.746 | 0.518 | <0.050 | 0.589 | 2.98 | 0.617 | 1.20 | 0.206 |
| Lead | 64.1 | <0.001 | 0.001 | <0.0005 | 0.004 | 0.019 | 0.003 | 0.005 | 0.001 |
| Manganese | 22,600 | 2.08 | 0.0710 | <0.020 | 0.065 | 24.9 | 0.203 | 0.855 | 0.058 |
| Nickel | 103 | 0.0047 | 0.0023 | 0.0017 | 0.0018 | 0.043 | 0.0073 | 0.017 | 0.0043 |
| Zinc | 39,200 | 0.153 | 0.136 | 0.0166 | 0.128 | 0.699 | 0.132 | 0.266 | 0.0485 |

As indicated in the Table 3, the reagents used included hydrogen peroxide, calcium sulfate, technical/merchant grade phosphoric acid, trisodium phosphate, triple super phosphate, calcium hydroxide, and calcium polysulfide singularly, or in various combinations. Only Treatment No. 07 provided the reagent system of the invention in its generic ratio and dose rates. All other applied treatments consisted of other reagent combinations found in prior art, but with an oxidizer added for some (i.e., Treatments 03, 04, and 06).

The data in Table 3 shows that TCLP testing was more rigorous and aggressive on leachable metals in untreated material than SPLP testing. It also shows that only the regime treated with the invention reagent-system (Treatment 07) reduced the leachability of all metals in treated solids as measured in TCLP and SPLP extracts. While other non-invention treatment regimens adequately reduced leachability of some metals in both extracts, leachability of metals including aluminum, iron, manganese, and zinc was not consistently reduced across both test methods. It is also clear that, while manganese leachability varied across the various regimen and tests, only the invention reagent-system, which included hydrogen peroxide, phosphoric acid, and calcium hydroxide, produced consistently low results. Where a sulfide-based reagent was utilized in conjunction with an oxidizer, it is suspected, based on some metal leachability results (e.g. 03, 05, and 06), that the oxidizer likely degraded the sulfide provided by the respective reagent and prevented treatment of all metals.

Table 4 presents additional data from the pilot study. Here, leachable metal concentrations in TCLP extract of untreated and treated lime solids are presented and compared against the limits of CDPHE's Basic Surface Water Quality Standards for Aquatic Life for both acute and chronic conditions from Regulation 31 Table Value Standard (TVS).

TABLE 4

Comparative Data for Invention-Treated vs. Untreated AMD Lime Solids
Invention Treated vs. Untreated AMD Lime Solids
Method 1311 (TCLP) - Toxic Characteristic
Leaching Procedure Test Results

| | | | CDPHE Res 31 - Basic Surface Water Quality Standards | | |
|---|---|---|---|---|---|
| Sample ID | Untreated (mg/L) | Invention Treated (mg/L) | Table 3 Aquatic Life (acute) mg/L | Table 3 Aquatic Life (chronic) mg/L | Parameter in TCLP Extract Meets Limit |
| Al | 9.11 | <0.046 | 2.307 | 0.329 | yes |
| As | <0.103 | <0.103 | 0.340 | 0.150 | yes |
| Cd | 0.579 | <0.250 | 0.002 | 0.000342 | DL too elevated. Leachability reduced by >2.3X |
| Co | 0.622 | <0.250 | N/A | N/A | Leachability reduced by over 2.4X |
| Cu | 21.3 | <0.113 | 0.010 | 0.007 | DL too elevated. Leachability reduced by >180X |
| Fe | <0.102 | <0.102 | N/A | 1.000 | yes |
| Pb | 0.022 | <0.018 | 0.047 | 0.002 | yes |
| Mn | 107 | 0.356 | 2.713 | 1.499 | yes |
| Ni | 0.291 | <0.250 | 0.367 | 0.041 | yes |
| Zn | 152 | 0.027 | 0.123 | 0.093 | yes |

CDPHE—Colorado Department of Public Health and the Environment
Water Quality Standards Adjusted for 75 mg/L hardness (excluding As & Fe) per the regulation
All data by Edge Analytical, Burlington, WA per USEPA approved methods
N/A—not available
N/T—not tested While some metals in untreated material leached at levels below the TVS and others were not quantified at a low enough detection limit, the data does show that the leachability of all metals was reduced, and that most met the most rigid standard for chronic exposure levels. This is notable in that the generic invention reagent system and dosage was applied without any efforts to optimize reagent ratios. Furthermore, TCLP extract fluid per the method replicates landfill leachate with acetate, and is thus more rigorous than that of site fluids that may encounter the treated material onsite, such as acid rain used in the SPLP method per the following table.

Table 5 also presents additional data from the pilot study. Here, however, leachable metal concentrations in SPLP (acid rain for western US) extract of untreated and treated lime solids are also presented and compared against the limits of CDPHE's Basic Surface Water Quality Standards for Aquatic Life for both acute and chronic conditions from Regulation 31 Table Value Standard (TVS).

TABLE 5

Invention-Treated vs. Untreated AMD Lime Solids
Invention Treated vs. Untreated AMD Lime Solids
Method 1312 (SPLP) - Synthetic
Precipitation Leaching Procedure Test Results
(Acid Rain - Western US - Colorado)

| | | | CDPHE Reg 31 - Basic Surface Water Quality Standards | | |
|---|---|---|---|---|---|
| Sample ID | Untreated (mg/L) | Invention Treated (mg/L) | Table 3 Aquatic Life | Table 3 Aquatic Life (chronic) | Parameter in SPLP Extract Meets Limit |
| Al | 0.336 | 0.219 | 2.307 | 0.329 | yes |
| As | NT | NT | 0.340 | 0.150 | not evaluated |
| Cd | 0.0009 | <0.0005 | 0.00213 | 0.000342 | yes |
| Co | N/A | N/A | N/A | N/A | N/A |
| Cu | 0.0442 | <0.018 | 0.010 | 0.007 | DL too elevated Leachability reduced by >2.4X |
| Fe | 0.746 | 0.206 | N/A | 1.000 | yes |
| Pb | 0.00100 | 0.001 | 0.047 | 0.002 | yes |
| Mn | 2.08 | 0.058 | 2.713 | 1.499 | yes |
| Ni | NT | NT | 0.367 | 0.041 | not evaluated |
| Zn | 0.153 | 0.0485 | 0.123 | 0.093 | yes |

CDPHE—Colorado Department of Public Health and the Environment
Water Quality Standards Adjusted for 75 mg/L hardness (excluding As & Fe) per the regulation
All data by Edge Analytical, Burlington, WA per USEPA approved methods
N/A—not available
N/T—not tested As in Table 4, some metals in untreated material leached at levels below the TVS, and others were not quantified at a low enough detection limit, but the data does show that the leachability of all metals was reduced, and that most met the most rigid standard for chronic exposure levels. This again is also notable in that the generic invention reagent system and dosage was applied without any efforts to optimize reagent ratios. Further, SPLP extract fluid per the method replicates acid rain for the western US, and while less rigorous than that of the TCLP fluids as well as actual site fluids used in the data of the FIGS. 1 and 2—series, the method does reflect exposure to synthesized acid rain, albeit made from laboratory grade reagents. Also consistent with treated material and its data in Table 4, the treated material evaluated with this testing (Table 5) was not processed using an optimized application of the invention's reagent-system. The generic invention reagent-system, dosage, and ratios were applied.

The data in Tables 4 and 5 demonstrate the ability of the invention to treat leachable metals to levels that comply with stringent water quality standards with further enhancement possible as determinable with optimization studies using the flexible invention reagent-system and as measured by leaching fluids that replicate landfill leachate as well as acid rain.

In another series of tests to evaluate the performance of the invention, an untreated and an invention-treated sample of the lime solids were analyzed separately using the two (2) extraction fluids previously described. Further, only the invention-treated materials were subjected to this expanded analytical evaluation. Other treatment regimens as well as invention-treated materials were evaluated using standard EPA Method 1311 and Method 1312 without modification for comparisons of technologies under base-line minimum requirements of treatment under solids waste regulation.

The FIG. 1—series and FIG. 2—series of graphs present the results of these extraction evaluations. Each graph represents the result of a specific metal in the ten (10) individual extraction of Method 1320. Each chart presents the concentration of the specific metal in the respective extraction fluid used, the extracted sample of the invention-treated material, and the untreated lime-solids as provided by EPA. The pH of the extraction fluid is indicated in the fluid, and the numeric concentration results within the body of the charts are in mg/L, i.e., mass of metal in volume of fluid. It is also important to note that, since fresh fluid from the respective sources was used for each extraction, the extract fluid used was only analyzed once at the onset of the testing procedures. These results are also presented in each graph in mg/L. It is also noted that because lead was present in total form in the solids at a very low level, and also at limited concentrations in each of the extraction fluids, this parameter was not evaluated through the treatment and testing study.

FIG. 1—Series (Invention Treated Vs. Untreated Lime Solids) Using Acidic Creek Water as the Extraction Fluid: pH 3.94 S.U.

FIG. 1A—Aluminum present in the extraction fluid was removed by both the treated and untreated lime solids in each of the ten (10) extractions from a level of 4.32 mg/L to approximately 0.25 mg/L or below, with the exception of Extraction No. 6 of the untreated sample which was still below 1 mg/L. Comparatively, both samples effectively removed aluminum from the extract fluid utilized, and retained the 60,100 mg/Kg total aluminum in the solid sample despite aluminum's amphoteric properties, suggesting that lime in the untreated sample was able to overcome the acidity provided by the extract fluid throughout the test.

Figure 1B:
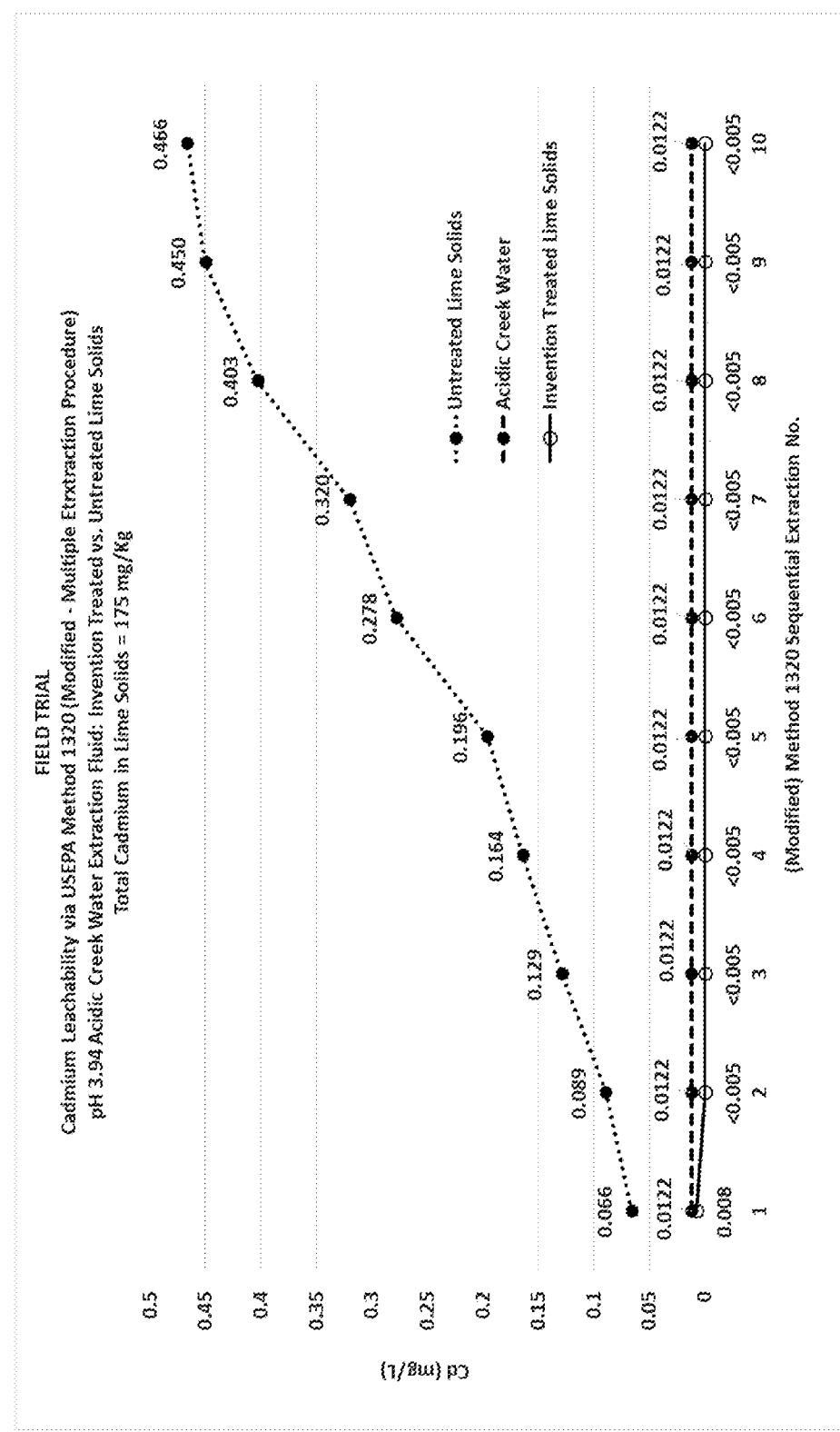

FIG. 1B—Cadmium present in the extraction fluid was at a low concentration level near the detection limit of the test method at 0.0122 mg/L. However, only the treated material removed cadmium from the extract fluid and retained the cadmium present in the treated lime solids over the entire 10 extractions to below the analytical detection limit in all but the first extraction. For the untreated lime solids, it is clearly evident from the data that the cadmium leached not only in excess of the concentrations in the extraction fluid, but increased steadily over the course of the sequential extractions. The invention treated material was able to overcome the acidity of the repeatedly applied extraction fluid, whereas the untreated lime sample did not. Furthermore, noting that the cadmium present in the lime solids was at a fairly low concentration level (175 mg/Kg), and that cadmium in the acidic creek water was also at a fairly low relative level (0.0122 mg/L) just slightly above the detection limit, only the treated material was able to not only remove the cadmium from the extraction fluid, but also keep the limited cadmium amounts in the solids from leaching. Untreated material freely released leachable cadmium to the extraction fluid.

Figure 1C:
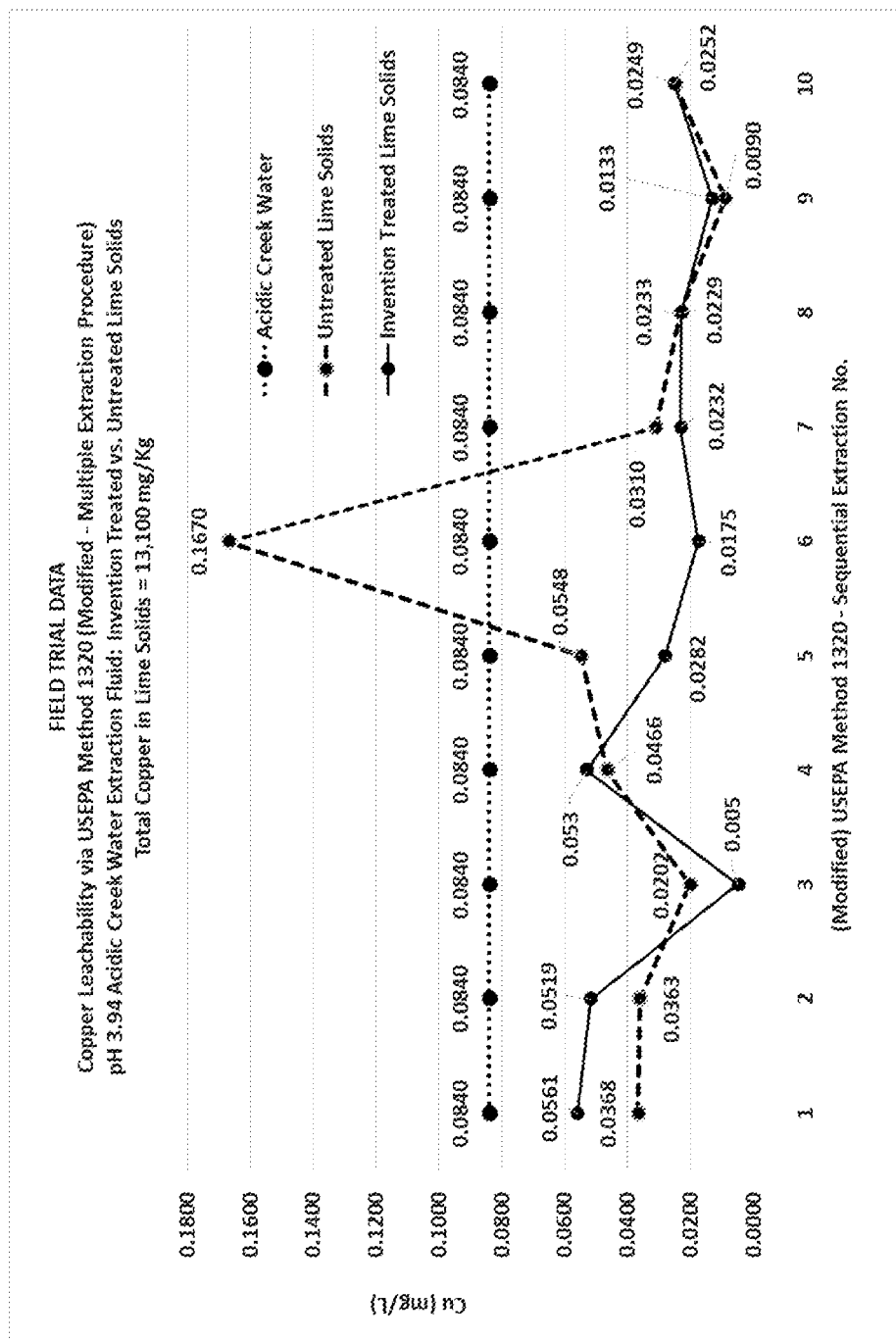

FIG. 1C—Copper present in the extraction fluid at 0.0840 mg/L was removed by both treated and untreated materials across the 10 extractions of the method, with the exception for Extraction No. 6 where copper was released from untreated material. Thereafter, copper release was limited, either due to the lime solids lacking more leachable copper, the solids' ability to retain the copper, or a combination of both. Leachable copper within the invention-treated material remained fairly non-leachable. Outside of the spike of copper from the untreated material, both materials removed copper from the extract fluid, although, since there was not a significant spike of copper evidenced in the treated sample data, it is evident that the treated material removed a higher mass of copper in total from the water than the untreated sample across all extractions.

Figure 1D:
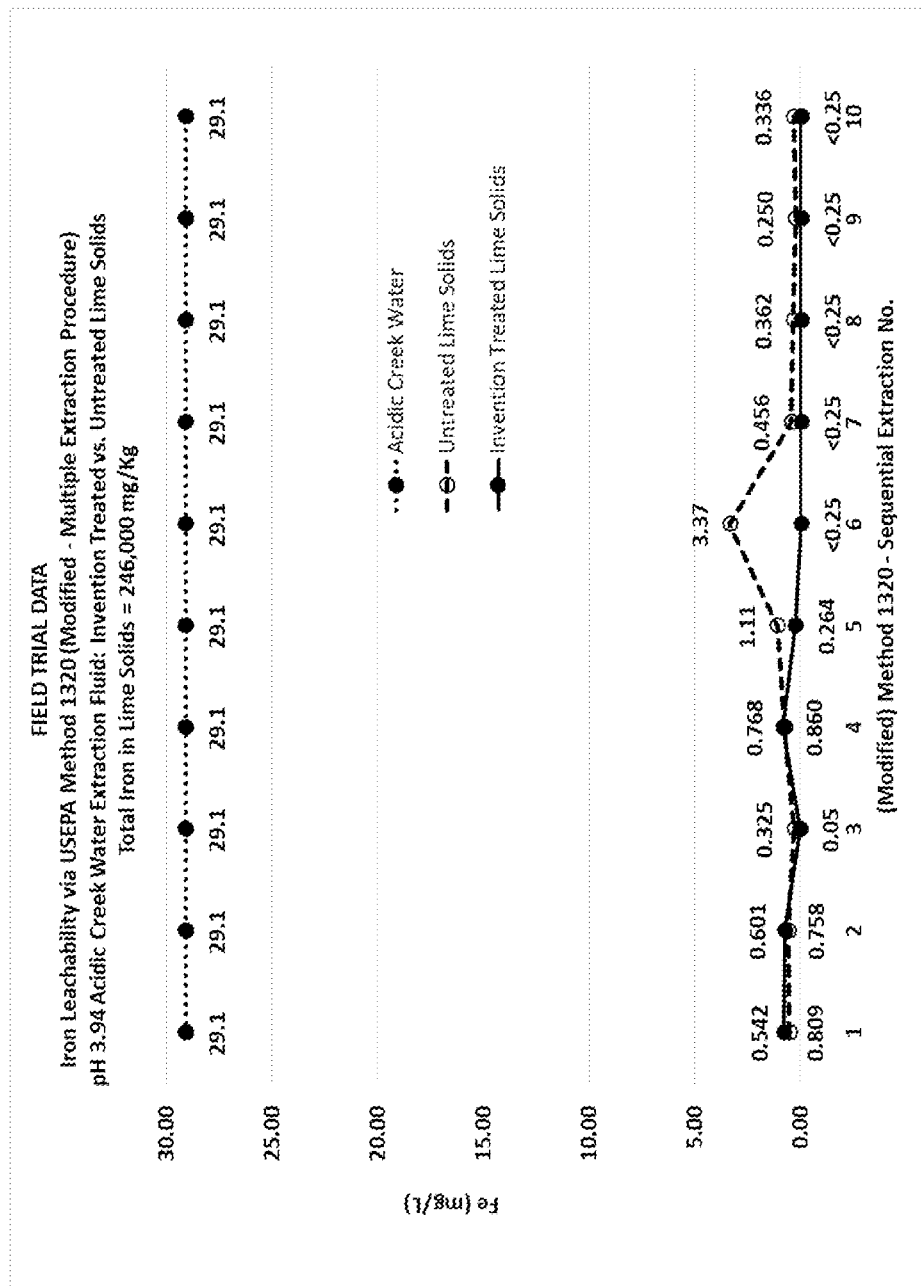

FIG. 1D—Iron results replicate the extraction pattern for aluminum. Although the iron is excessively more concentrated in the extraction fluid than aluminum, both the treated and untreated samples removed iron from the fluid and leached only limited concentrations with the treated sample releasing iron that was below the analytical detection limit of the method in the last half of the extracted sample. Of note is the spike of iron concentration in Extraction No. 6, the same extraction where both aluminum and cadmium had similar spike patterns, suggesting that the ability of untreated lime solids to overcome the pH of the extract fluid at this point in the series of extractions was at a critical moment. In contrast, treated material did not have such spikes for the same metals.

Figure 1E:
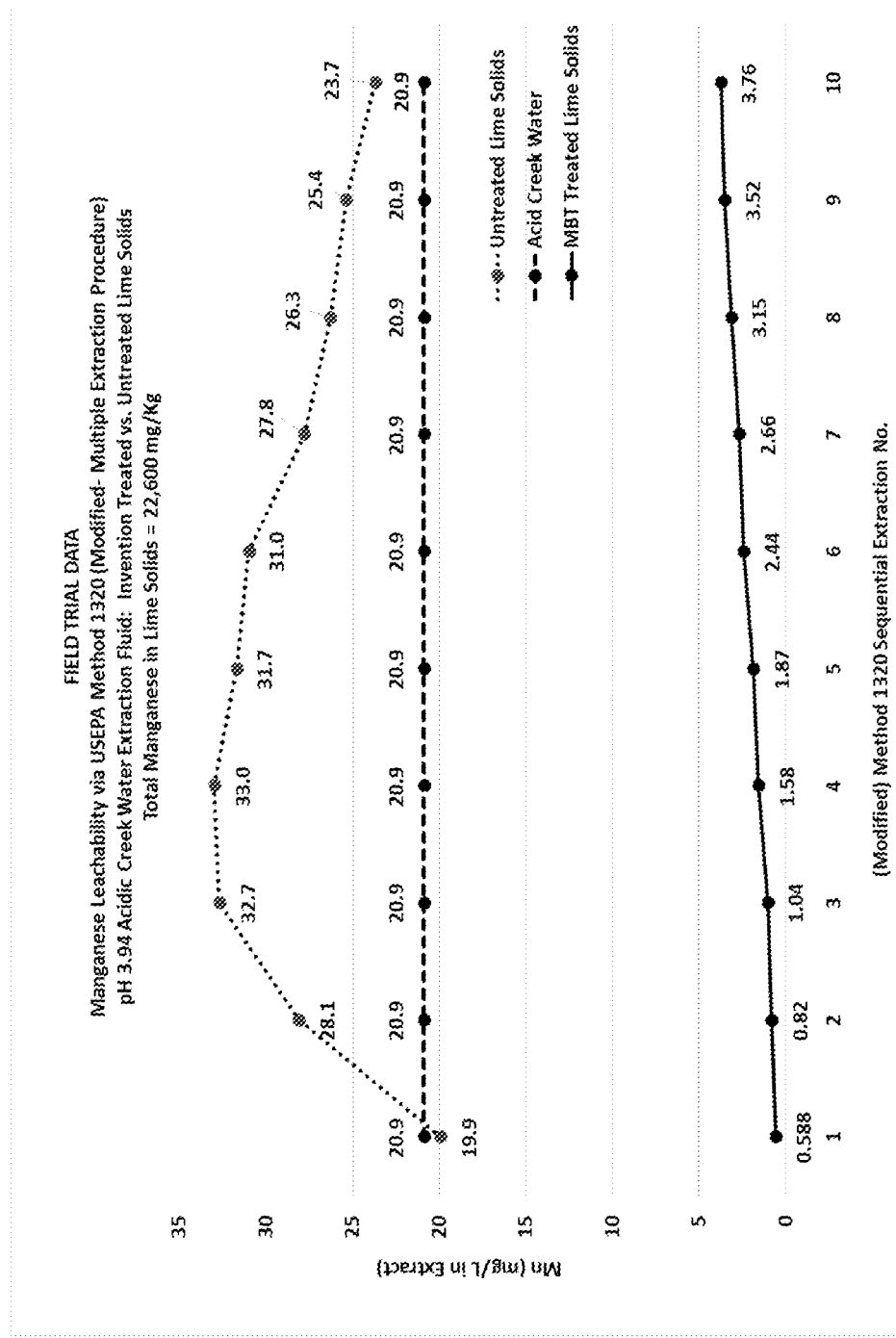

FIG. 1E—Manganese data comparisons clearly indicate the importance of the oxidizer used in the invention. With a total manganese content of 22,600 mg/Kg in the lime solids, and 20.9 mg/L in the extract, the treated material was still able to remove most of the manganese from the extract fluid as well as retain the manganese within the treated mass. Untreated material, however, was stable in the first extraction, balanced with the extract fluid, but manganese in sequential extracts thereafter increased by approximately 30% in the next series of extractions before starting to drop back to the level near that of the extraction fluid. Untreated material was not able to retain leachable manganese or remove it from the extraction fluid. The invention was able to put manganese into a reactive state and stabilize it against the influences of the extraction method and the fluid used.

Figure 1F:
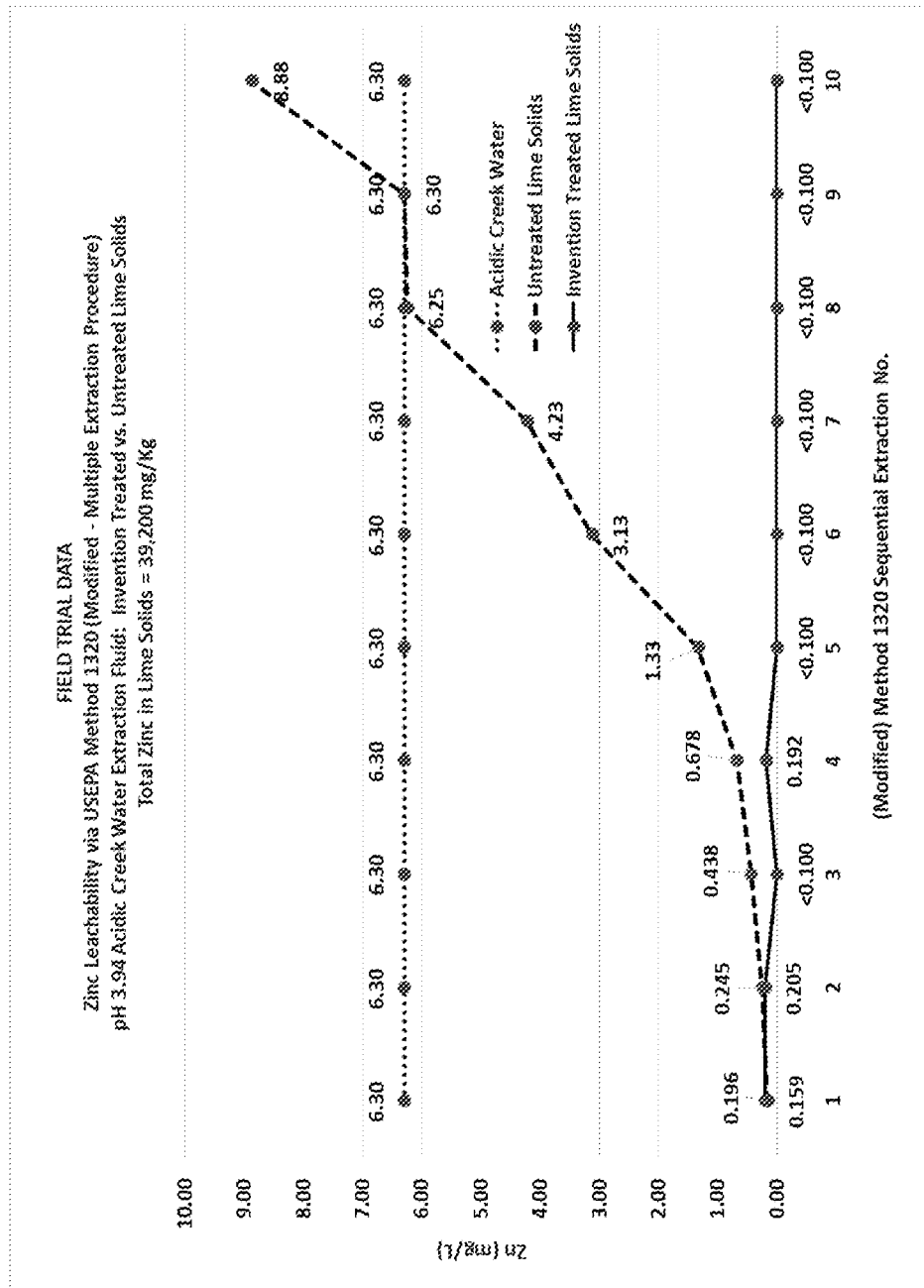

FIG. 1F—Zinc remained stable in the treated material throughout the entire testing sequence. Further, zinc within the extraction fluid (6 mg/L) was also removed by the treated material. While untreated material retained and removed zinc from the extraction fluid for the initial extraction, leachable zinc steadily increased throughout the rest of the extractions. At Extraction No. 6, zinc release significantly increased from the previous extraction before it plateaued and then climbed again toward the end of the extraction sequence. While not overly clear, the data does suggest the untreated material's inability to overcome the pH neutralization affects from the extract fluid, whereas zinc in treated material remained stable and consistently removed the zinc from the extraction fluid throughout.

Summarizing the data presented in FIG. 1—series, an embodiment of the present invention using hydrogen peroxide, phosphoric acid, and calcium hydroxide, when applied to water treatment solid residuals derived from the treatment of acid mine drainage, reduced the leachability of those metals within the solids when invention-treated solids were repeatedly and robustly exposed to acidity and abrasive mixing with the extract fluid. Untreated lime solids that were generated with the addition of calcium hydroxide to AMD to cause the formation of insoluble metallic hydroxides and their subsequent precipitation from water failed to retain those same metals with repeated exposure to acidic creek water, or remove metals from the fluid. The invention, in addition to reducing the leachability of metals from treated solids, also removed heavy metals from the acidic fluid to which the solids were exposed. When compared, untreated lime solids, while capable of removing some metals from the same-sourced extraction fluid as well as retaining some metals within the solids, were not able to reduce the leachability of all metals of concern, which included aluminum, cadmium, copper, iron, manganese, and zinc collectively. Untreated material was unable to not only adequately retain, but also remove cadmium, copper, manganese, and zinc throughout the testing series from the extraction fluid. The invention is clearly able to reduce the leachability of metals from solid materials when invention-treated solids are exposed to acidic waters present within a legacy mine site characterized with acidic fluids, migratory heavy metals, and heavy metals that are leachable from water treatment solids.

FIG. 2—Series (Invention Treated Vs. Untreated Lime Solids) Using Acid Mine Drainage as the Extraction Fluid: pH 3.09 S.U.

Figure 2A:
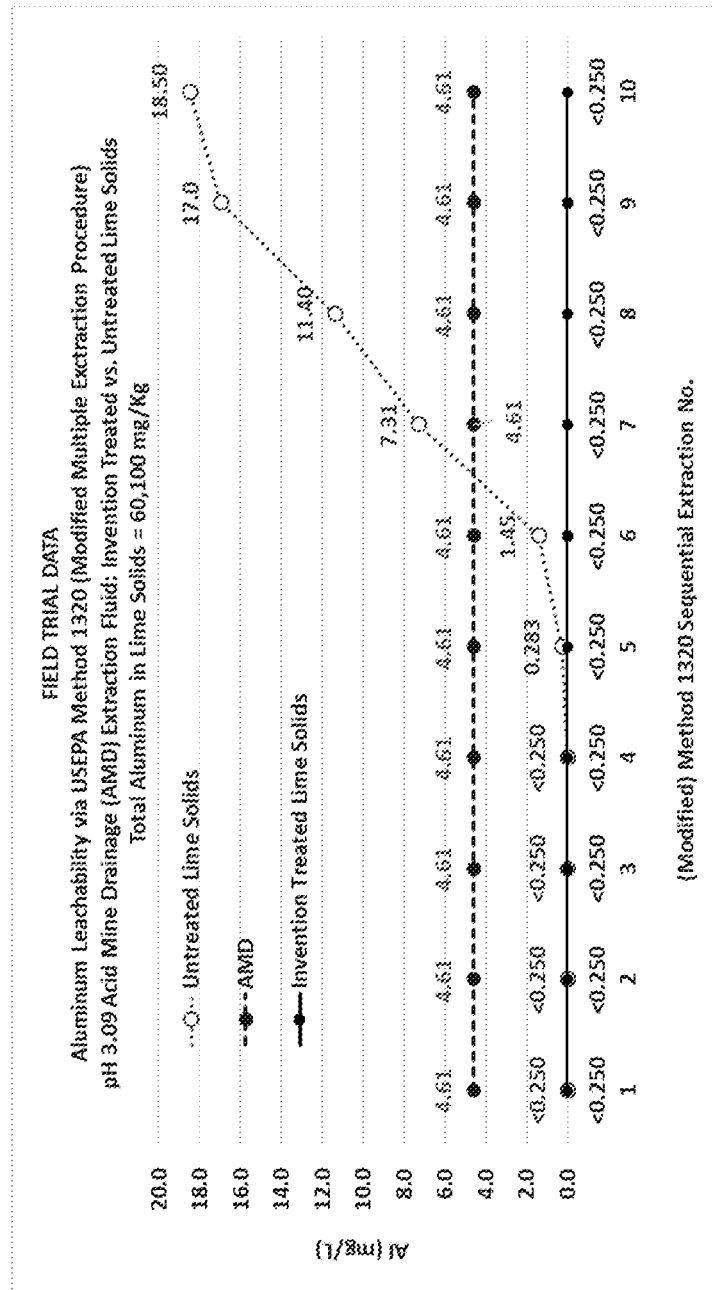
FIGS. 2A-2H compare metal leachability data using acidic creek water as the extraction fluid in a modified Method 1320 MEP leachability test comparing leachable metals in invention-treated lime solids against metals as totals in the acidic mine drainage and those in extracts of untreated lime solids.

FIG. 2A—Aluminum present in the extraction fluid was removed by both the treated and untreated lime solids in each of the ten (10) extractions from a level of 4.61 mg/L to less than 0.25 mg/L through the first four (4) extractions for both samples. Thereafter, through the tenth and final extraction, only the invention-treated material retained aluminum at the same level, whereas the untreated lime solids increasingly released aluminum from the level of non-detection to over 30 times the concentration of aluminum in the extraction fluid. Only the treated lime solids of the invention converted the 60,100 mg/Kg of aluminum in the solids to stable forms and also removed aluminum from the extraction fluid.

Figure 2B:
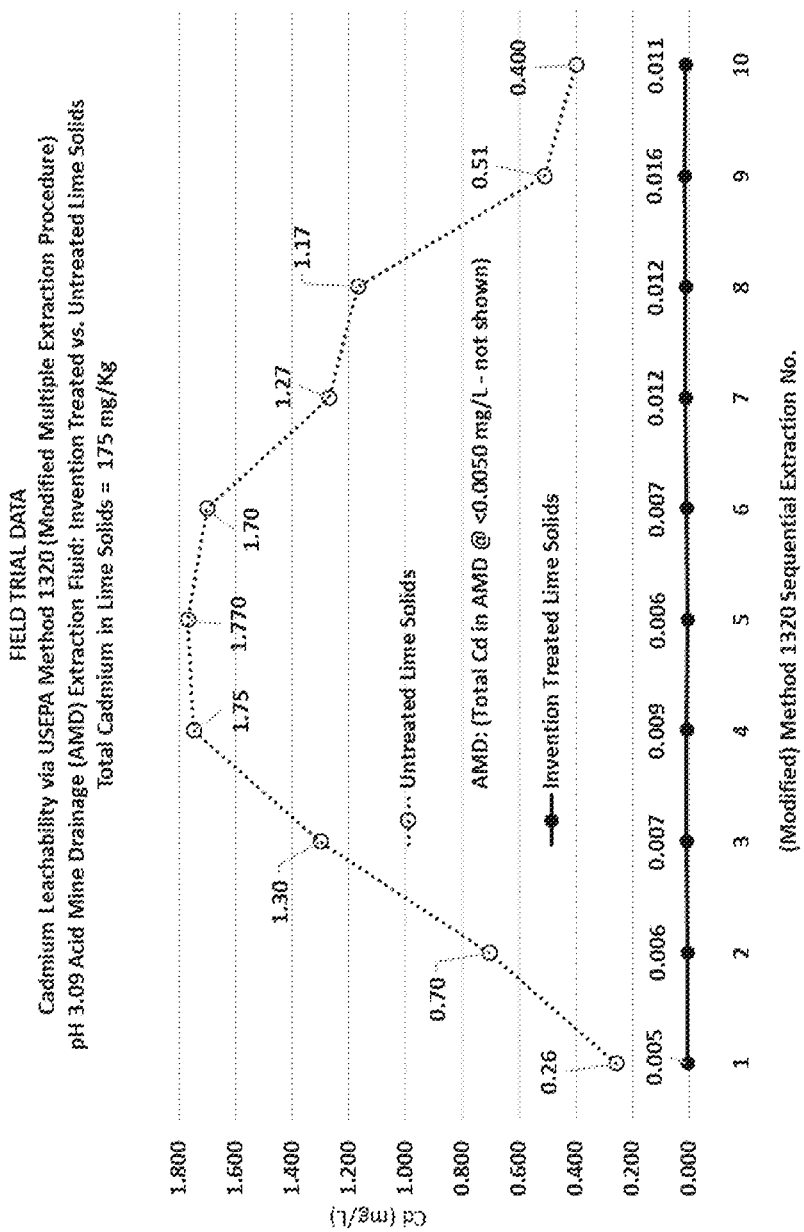

FIG. 2B—Cadmium in the extract fluid was below the analytical method detection limit of <0.0500 mg/L, and the concentration of leachable cadmium in each of the ten method extractions were also near or at that level. Untreated material clearly released cadmium increasingly through Extraction No. 4 where it reached a level nearly 200 times that of the treated material and over 350 times that of the cadmium used in the fluid. From Extraction No. 5 through the complete series of tests, cadmium levels plateaued, and then declined to a concentration that was still 40 times that of cadmium in the treated material in the last extraction. Again, only the material treated by the invention was able to convert cadmium to a stable form in the solid material as well as remove cadmium from the extraction fluid.

Figure 2C:
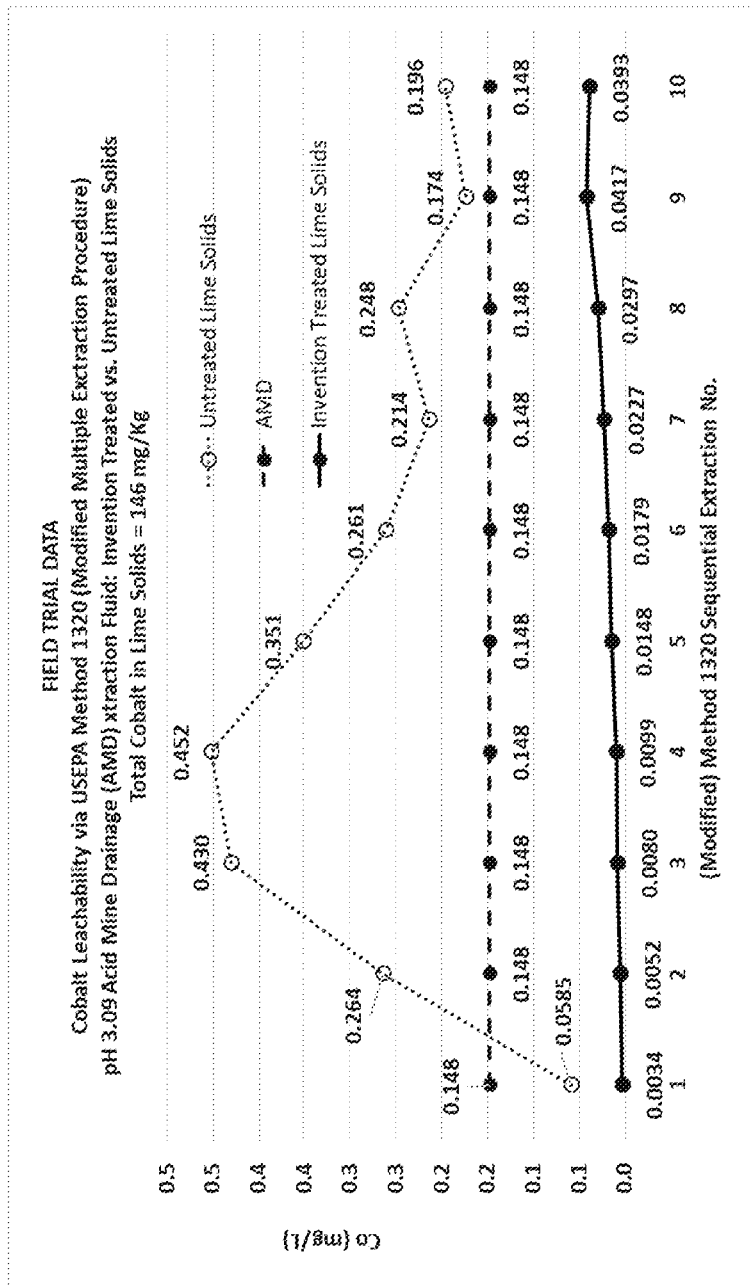

FIG. 2C—Cobalt result patterns are similar to those of cadmium in both the invention-treated material and untreated material throughout the testing, albeit cobalt in the AMD was elevated at 0.148 mg/L. While total cobalt was only 146 mg/Kg in the lime solids, treated material was able convert it to a less leachable form as well as remove cobalt from the extraction fluid. The untreated lime solids did not.

Figure 2D:
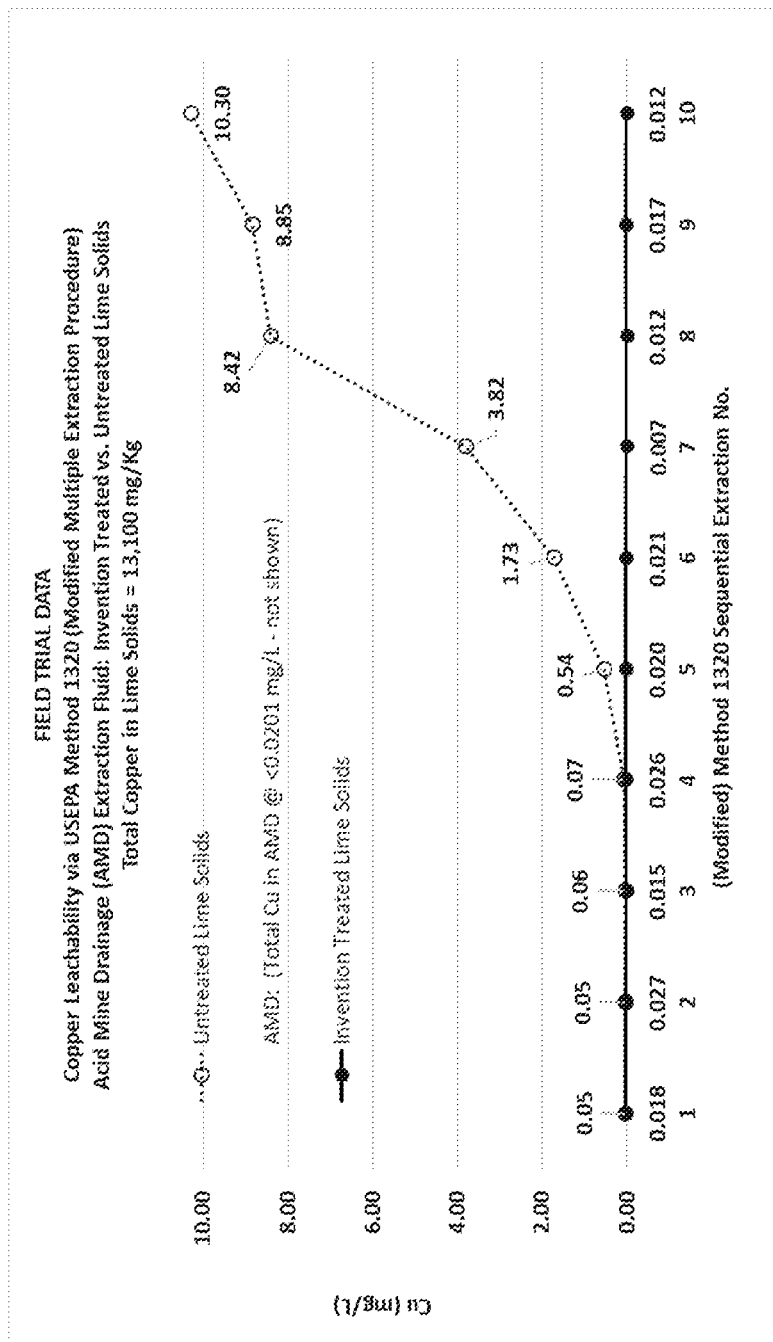

FIG. 2D—As with cadmium, copper presence in the extraction fluid was below the analytical detection limit (<0.0201 mg/L). Total copper in the lime solids was elevated at 13,100 mg/Kg. Again, only the invention-treated material was able to reduce the leachability of copper within the solids to a stable state throughout all 10 extractions. Untreated material started to notably leach copper in Extraction No. 5. By the 10th and final extraction, copper was leaching at a level of over 800 times that of copper leaching from the treated material.

Figure 2E:
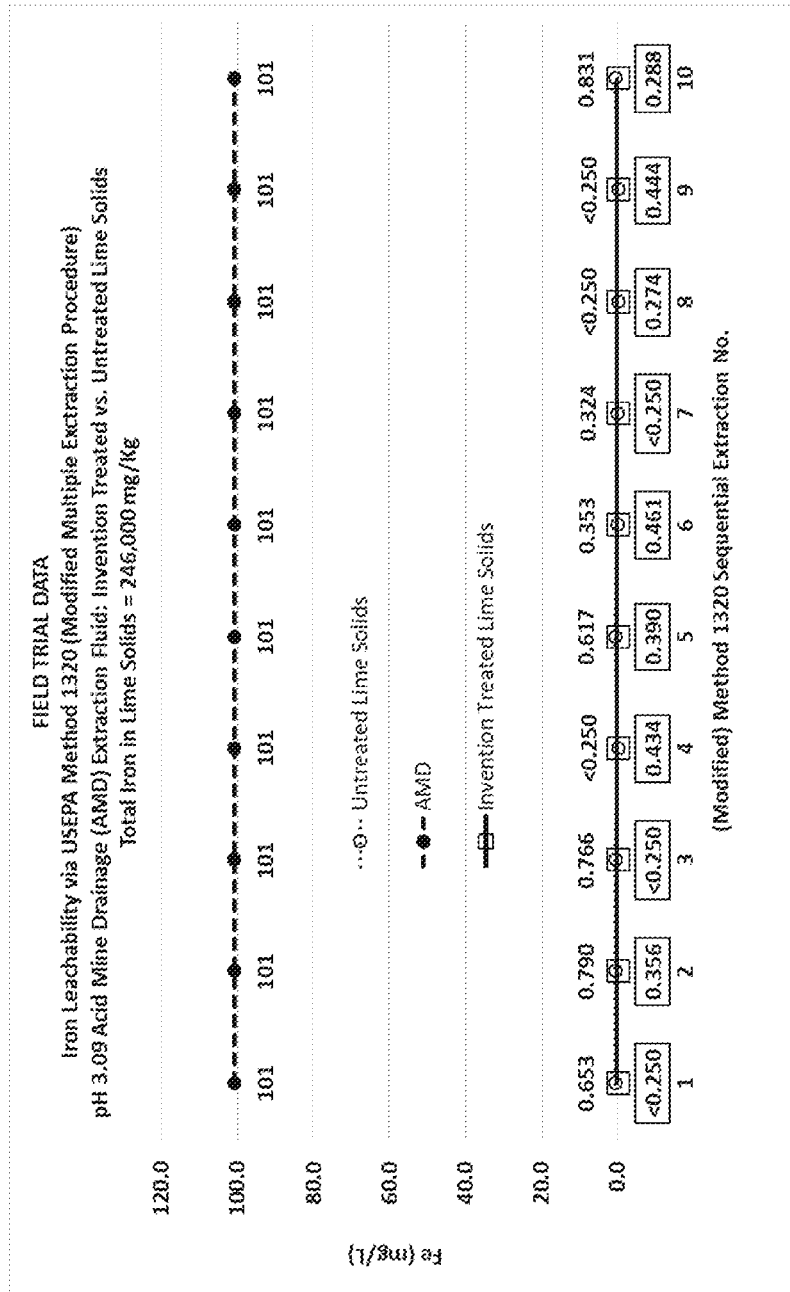

FIG. 2E—Elevated levels of iron at 101 mg/L in the extraction fluid were suitably removed by both the treated and untreated lime solids. This is also notable in that total iron in the lime solids was 246,000 mg/L.

Figure 2F:
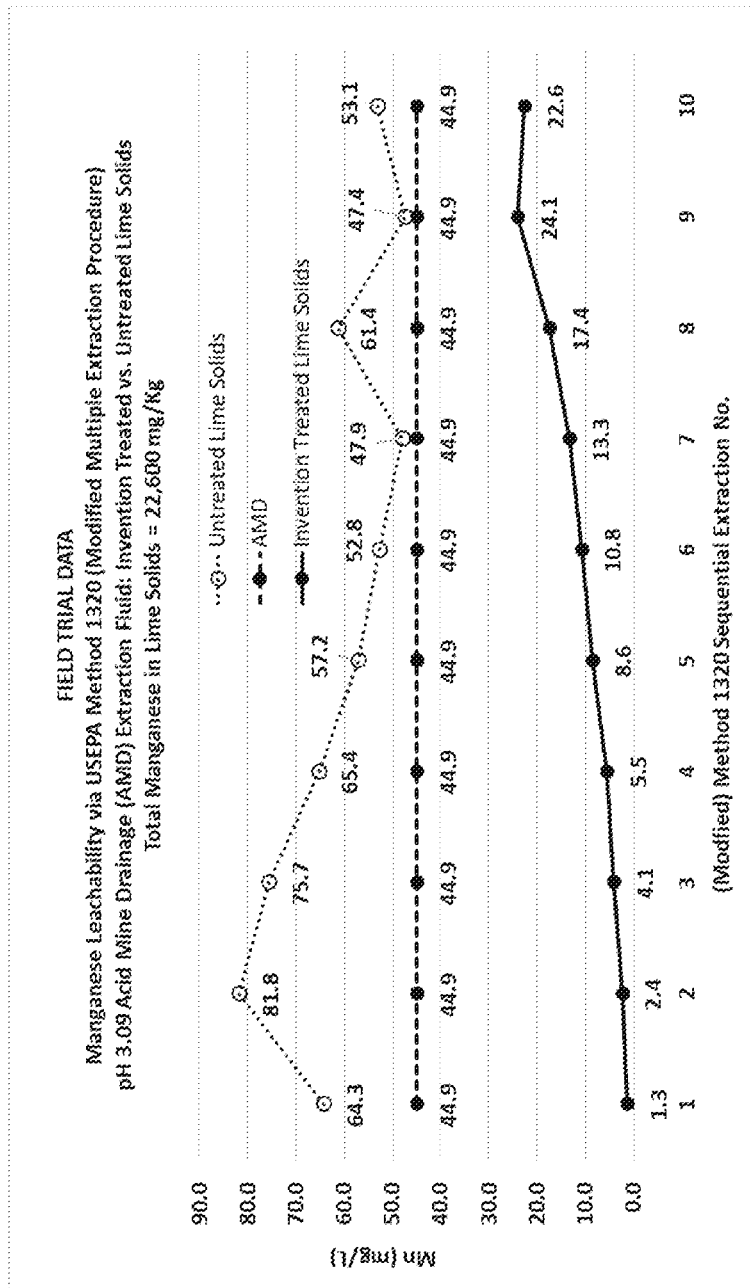

FIG. 2F—As with the data from the acidic creek water testing, manganese data comparisons clearly indicate the importance of the oxidizer used in the invention. Further, the untreated material was never able to retain manganese at a concentration below that of the extraction fluid after the first extraction, reaching a level of over 30 times that of leachable manganese from treated solids in the corresponding Extraction No. 2. With a total manganese of 22,600 mg/Kg in the lime solids, and 44.9, over 2 times the 20.9 mg/L in the acidic creek water extraction fluid, the treated material was still able to remove most of the manganese from the extract fluid as well as retain the manganese within the treated mass. Again, the invention was able to put manganese into a reactive state and stabilize it against the influences of the extraction method and the fluid used where untreated material did not.

Figure 2G:
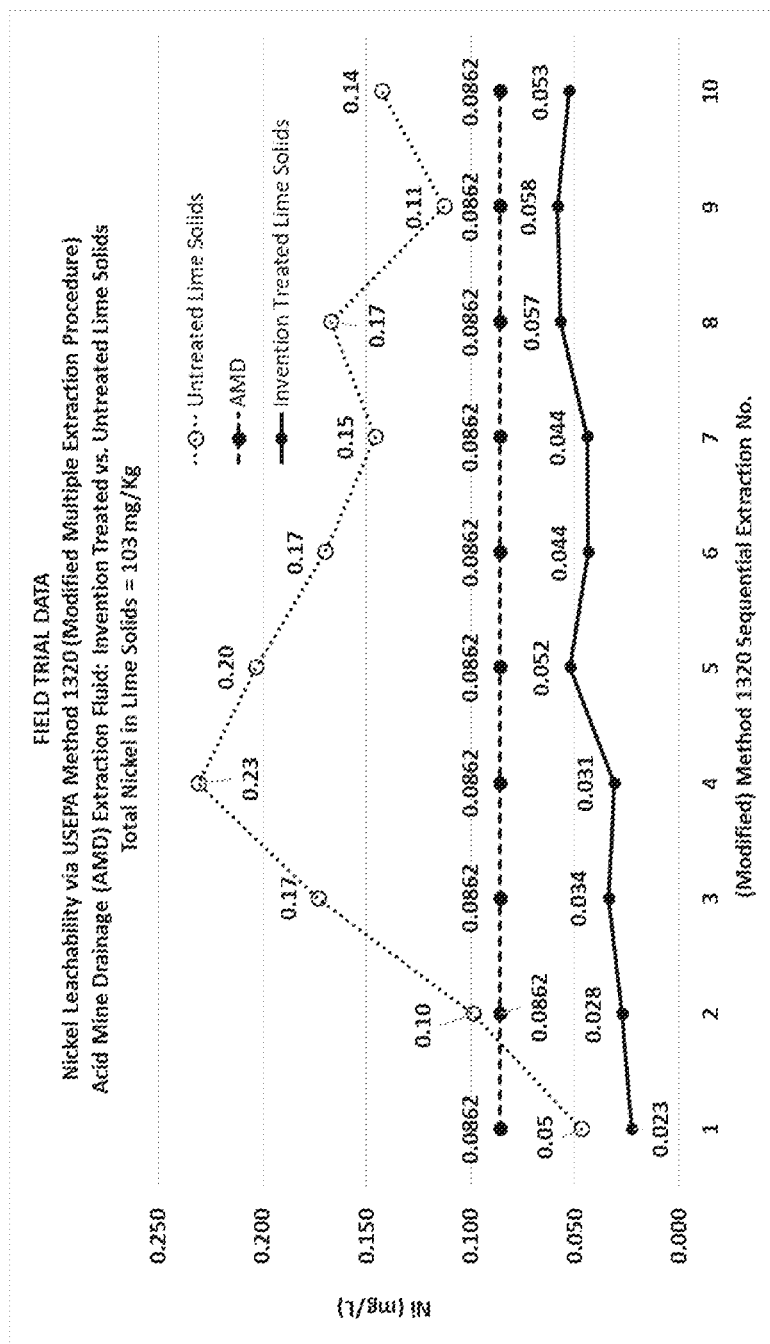

FIG. 2G—While total nickel in the lime solids was limited in concentration, its leachable forms and those within the AMD extraction fluid, also limited, were largely removed by the invention-treated lime solids in all ten extractions. Untreated material, was only able to retain and remove nickel to below the level of that present in the extraction fluid in the first extraction.

Figure 2H:
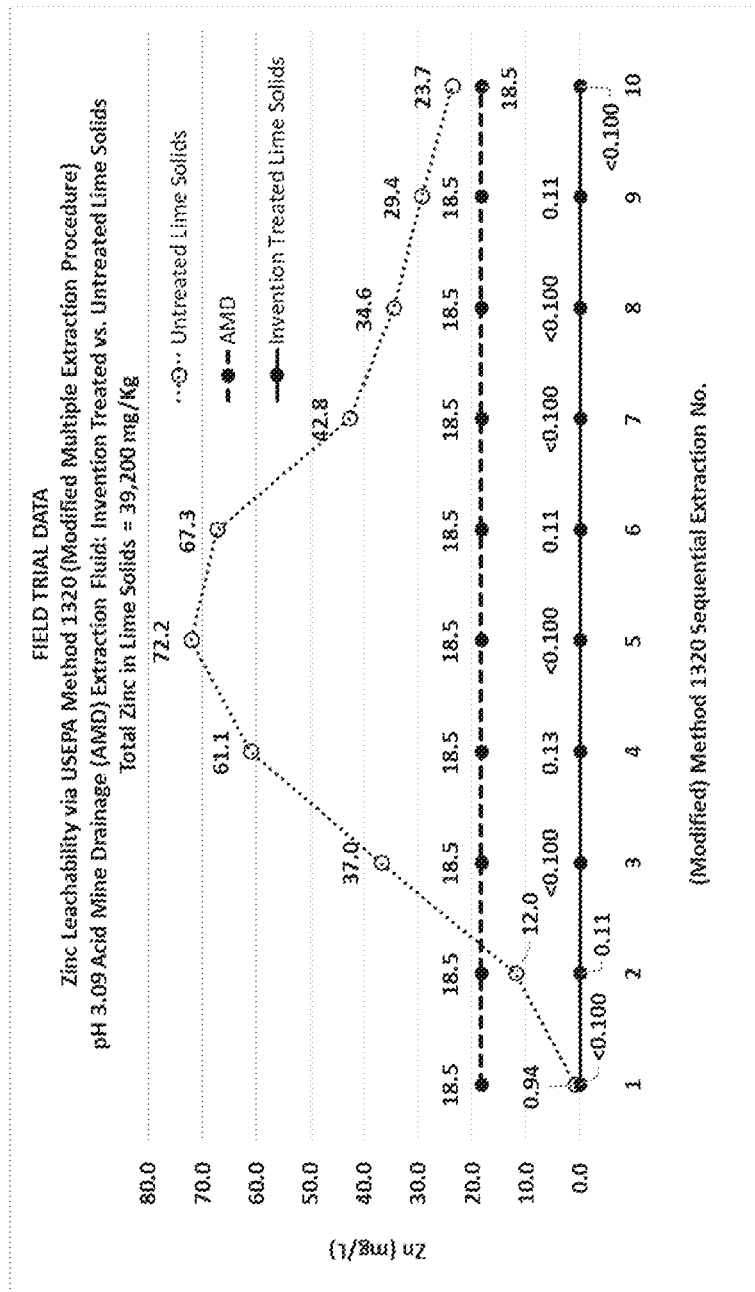

FIG. 2H—Zinc leachability from untreated lime solids had a similar leachability pattern across all ten extractions with cadmium, cobalt, and nickel, where only the first extraction contained less zinc the remaining nine extraction and where zinc leachability increased through the middle extraction after which concentrations in extracts contained decreasing amounts. For invention-treated lime solids, leachable zinc remained at or near the detection limit of <0.10 mg/L for the entire 10 extractions while also removing over 18 mg/L of zinc from the extraction fluids in each extraction.

In summary of the test results presented in the Figures of Series-2, invention-treated materials routinely contained heavy metal substances of reduced leachability in the solids and removed heavy metals from the extraction fluid. Heavy metals removed from the fluid and within the treated solids were converted to stable forms and included a broad-spectrum of different metal species, common to both mining sites as well as other material waste types similarly containing numerous leachable hazardous metal substances.

While it is understood that mining and other sites that contain a variety of metals of which many are leachable and/or hazardous substances, to the invention reagent system and method is capable of treating even the most contaminated materials at such sites. Those materials posing the most risk may be treated with the invention and subsequently managed to protect human health and the environment. Another feature is the ability to use invention-treated material in the construction of management facilities such as repositories, or other embankments where not all material is treated that is placed within the limits of the treated material used in the facility's construction. In such applications, invention-treated material can be used for facility floors, sidewall, covers and caps under an engineered surface. As such, acidic or other fluid containing heavy metals that come may come in contact with the treated material will be improved in overall water quality. In another embodiment, treated material engineered to enhance its permeability with the addition of clean or treated sand, gravel, etc. to facilitate migration of contaminated site water through the mass of treated material to also enhance permeate or percolated water quality. As such, invention treated material can be used as an end-product, or in the manufacture of other construction materials to further help minimize risk of migratory hazardous metal substances and acidity from a contaminated area. Importantly, the invention is consistent with the intent of the RCRA Bevill amendment where treatment of all materials at a mine site is not practical or economically feasible. The invention provides a tool for site remedy designers to enhance protections to the environment and human health for the most severe materials at not only mining sites, but also those where a multitude of leachable metals are present.

In another experiment to evaluate the effectiveness of the invention, a reagent system as described was applied to solid material collected from the South Fork of the Coeur d'Alene River in Smelterville, Ind. The material consisted primarily of jig tailings from within the Bunker Hill Mine and Metallurgical NPL Superfund site. Four samples were treated with a particular reagent system selected as follows: Treatment A represents material treated with a reagent system corresponding to an embodiment of the invention, with an oxidizer (hydrogen peroxide), phosphate (phosphoric acid), and a hydroxide (calcium hydroxide) at 1%, 4.5%, and 6% by weight of untreated material, respectively. Water was added at 8% by weight of untreated material. Treatment B represents material treated with a reagent system consisting of phosphate and hydroxide at the same doses as Treatment A, but without oxidizer. Treatment C represents material treated with a reagent system consisting of sulfide (5%), phosphate (1.8%), and hydroxide (2%), but without any oxidizer. Treatment D represents material treated with technical grade phosphoric acid at 4.5%, without hydroxide or oxidizer. All testing was performed in accordance with U.S. EPA SW-846 test methods. pH measurements were taken from a 1:10 mass ratio of sample:deionized water on a laboratory bench-top using a three (3) buffer calibrated pH meter. The results are summarized in Table 6:

TABLE 6

Comparison of Jig Tailings Treated with the Invention and other Reagents

| Parameter | Total (mg/Kg) | Untreated TCLP (mg/L) | Treatment A TCLP (mg/L) | Treatment B TCLP (mg/L) | Treatment C TCLP (mg/L) | Treatment D TCLP (mg/L) |
|---|---|---|---|---|---|---|
| Aluminum | 11,310 | 1.18 | 0.33 | 0.17 | 0.02 | 0.89 |
| Arsenic | 212 | <0.100 | <0.100 | 0.34 | <0.100 | 0.26 |
| Cadmium | 18.3 | 0.32 | <0.025 | 0.28 | <0.025 | 0.46 |
| Iron | 84,278 | 1.33 | 0.57 | 0.27 | 0.02 | 0.03 |
| Lead | 8147 | 69.23 | 0.13 | 2.83 | <0.050 | 0.08 |
| Manganese | 4698 | 11.54 | 0.69 | 17.72 | 5.69 | 12.2 |
| Selenium | <0.26 | 0.03 | <0.025 | <0.025 | <0.025 | 0.02 |
| Zinc | 3740 | 25.23 | 0.16 | 9.8 | 0.14 | 8.6 |
| pH (S.U.) | | 5.88 | 5.88 | 11.0 | 9.84 | 12.36 | 5.32 |
| Reagents (% by wt.) | | | | | | |
| Hydrogen Peroxide | | | 1.0% | | | |
| Calcium sulfide | | | | | 5.0% | |
| Calcium polysulfide | | | | | | |
| Phosphoric acid | | | | | | 4.5% |
| Trisodium Phosphate | | | 4.5% | 4.5% | | |
| Triple Superphosphate | | | | | 1.8% | |
| Calicum hydroxide | | | 6.0% | | 2.0% | |
| Water | | | 8.0% | 9.0% | 5.0% | 7% |
| Total Reagent Addition (without water) | | | 11.5% | 4.5% | 8.8% | 4.5% |

Leachable lead levels in untreated jig tailings failed RCRA toxicity limits for characteristically hazardous waste. Leachable manganese and zinc are problematic to aquatic organisms and downstream water quality. As evidenced in the data, only Treatment A, using the present invention reagents, was able to reduce the leachability of all metal constituents, and notably lead, manganese, and zinc.

A reagent system corresponding to one embodiment of the invention was applied to untreated material obtained from a NPL Superfund site located in the northeastern U.S. The site consisted of a wetland that was on the property of a former manufacturing facility that contributed lead, barium, and high molecular weight petroleum hydrocarbons similar to the tacky and odiferous nature of degraded No. 6 fuel oil. Material treated in the study also contained extensive amounts of root mass and "peaty" solid materials. An intent of the study was to evaluate the present invention's ability reduce the leachability of lead to below 1.0 mg/L, and leachable barium to below 0.1 mg/L, as evaluated in Method 1312—SPLP (acid rain for the eastern U.S.) extract to allow for its management onsite after treatment. Sample 1 utilized the reagents of the present invention at a reduced dosage regimen. Sample 2 also incorporated a sulfide, but without an oxidizer. Samples 3 and 4 applied phosphate and hydroxide, but without an oxidizer. Sample 5 utilized the reagents of the invention as with Sample 1, but with varied form and dose of phosphate, and an increased dose of both hydroxide and the mixed oxidizer consisting of blend of hydrogen peroxide and sodium persulfate. The results of the study are presented in Table 7:

TABLE 7

Lead and Barium Treatability Study on Soil from a Northeastern U.S. NPL Site
Northeastern US NPL Site
Method 1312 - SPLP (Eastern US) - Metals (mg/L)

| Parameter | Untreated Total Metals (mg/Kg) | Untreated | Sample 1 | Sample 2 | Sample 3 | Sample 4 | Sample 5 |
|---|---|---|---|---|---|---|---|
| | | | SPLP (mg/L) | | | | |
| Lead | 17,256 | 2.08 | 1.32 | 1.55 | 3.88 | 10.5 | <0.05 |
| Barium | 864 | 0.21 | 0.26 | 0.11 | 0.25 | 0.35 | 0.05 |
| Reagent (wt % to soil as sampled) | | | | | | | |
| Phosphoric Acid | | | | | 4% | | 4.0% |
| Trisodium Phosphate | | | 4.0% | 4% | | 5% | |
| Ca hydroxide | | | 3.0% | 1% | 5% | 2% | 5.0% |
| Ca sulfide | | | | 4% | | | |
| Oxidizer (mixed peroxide/persulfate) | | | 0.5% | | | | 0.75% |
| SubTotal (%) | | | 7.5% | 9.0% | 9.0% | 7.2% | 9.75% |
| Water | | | 5.0% | 6.0% | 5.0% | 4.0% | 3.0% |
| TOTAL w/Water | | | 12.5% | 15.0% | 14.0% | 11.2% | 12.75% |

As evidenced in the data, only Sample 5 met all criteria for lead and barium in SPLP extracts of the treated materials. Samples 1 and 2 were reduced their leachability, but exceeded the limits. Samples 3 and 4 actually increased the leachable levels of both lead and barium to well over the desired limits and above the untreated levels. Barium and lead ions are not typically affected by oxidation/reduction conditions. However, it is evident that the oxidizer of the invention did enhance treatment performance. The oxidizer likely facilitated the release of the metals by degrading organic vegetative matter as well as high molecular weight hydrocarbons/Bunker C constituents that either prevented the metals from reacting with the reagents or absorbed the metals forming a partially soluble material.

An embodiment of the invention was also evaluated for efficacy under European Union standards. A sample of plating waste sludge was analyzed for metals as totals and leachable species for those metals found in the solids waste. The leaching extraction method followed EN 1245/2 procedures using deionized water as the extraction fluid, pursuant to regulations of the European Union for waste characterization. The results are shown in Table 7:

TABLE 8

Heavy Metals in Plating Waste Sludge - European Test Procedure

| Parameter | Total | Units | Untreated Leached | Units | Treated Leached | Units |
|---|---|---|---|---|---|---|
| pH | 8.27 | S.U. | | | | |
| Chromium (III) | 114,000 | mg/Kg | 73.9 | mg/L | 0.354 | mg/L |
| Cobalt | 3.88 | mg/Kg | <0.01 | mg/L | <0.01 | mg/L |
| Copper | 116,420 | mg/Kg | 30.5 | mg/L | 0.71 | mg/L |
| Lead | 6064 | mg/Kg | 25.2 | mg/L | <0.050 | mg/L |
| Tin | 45.8 | mg/Kg | 0.88 | mg/L | <0.01 | mg/L |
| Vanadium | 23.8 | mg/Kg | <0.01 | mg/L | <0.01 | mg/L |

Extracted per EN 12457/2
(10 L DI water: 1 Kg sample)
Reagents in order of addition (% by wt.):

| | |
|---|---|
| Water | 8% |
| Trisodium phosphate | 2% |
| Calcium hydroxide | 6% |
| Phosphoric Acid | 0.5% |
| Hydrogen peroxide | 0.25% |
| Total Reagent without water | 8.75% |

While the European test method does not apply to U.S. EPA criteria for waste evaluation, the results demonstrate the ability of the present invention to reduce the leachability of metals when extracted with pure laboratory grade deionized water. Chromium, cobalt, copper, lead, tin, and vanadium were all found to be present in the plating waste sludge at levels above the detection limit of the analytical methods. The reagents of the invention were able to reduce the leachability of the metals present to below 1 mg/L for all metals that leached from the untreated sludge.

Upon reading this disclosure, other embodiments and modifications may be apparent to the skilled person. Further studies can help identify preferred reagents and optimized dosage ranges for specific wastes and other solid material. The present invention is limited only by the appended claims and equivalents thereof.

What is claimed is:

1. A reagent system for treating solid waste contaminated with one or more heavy metals, comprising a combined blend of:
   an oxidizer,
   a water soluble phosphate selected from the group consisting of phosphoric acid, trisodium phosphate, phosphate salts containing calcium, and mixtures thereof, and
   an alkali hydroxide or hydroxide source.

2. The reagent system of claim 1, further comprising water.

3. The reagent system of claim 1, wherein the oxidizer is selected from the group consisting of hydrogen peroxide, hypochlorous acid, hypohalites, persulfate, percarbonates, perborate, ozone in aqueous solution, and mixtures thereof.

4. The reagent system of claim 1, wherein the alkali hydroxide or hydroxide source is selected from the group consisting of caustic soda, potash, lime, slaked lime, and mixtures thereof.

5. The reagent system of claim 1, containing trisodium phosphate as the water soluble phosphate and the hydroxide source.

* * * * *